United States Patent
Tan et al.

(10) Patent No.: US 9,131,053 B1
(45) Date of Patent: *Sep. 8, 2015

(54) METHOD AND SYSTEM FOR IMPROVING CALL-PARTICIPANT BEHAVIOR THROUGH GAME MECHANICS

(71) Applicant: Prosodica, LLC, Deerfield, IL (US)

(72) Inventors: Mariano Tan, Henderson, NV (US); David Lampert, Avon, CT (US); Alex Nash, Gurnee, IL (US)

(73) Assignee: Prosodica, LLC, Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,862

(22) Filed: Nov. 21, 2014

Related U.S. Application Data

(63) Continuation of application No. 14/149,552, filed on Jan. 7, 2014, now Pat. No. 8,897,437.

(60) Provisional application No. 61/750,056, filed on Jan. 8, 2013.

(51) Int. Cl.
| | |
|---|---|
| *H04M 3/00* | (2006.01) |
| *H04M 5/00* | (2006.01) |
| *H04M 3/51* | (2006.01) |

(52) U.S. Cl.
CPC ...... *H04M 3/5175* (2013.01); *H04M 2203/402* (2013.01)

(58) Field of Classification Search
USPC .................................. 379/265.07, 265.02
See application file for complete search history.

(56) References Cited

U.S. PATENT DOCUMENTS

| | | | |
|---|---|---|---|
| 6,347,373 B1 * | 2/2002 | Hoepman et al. | 713/168 |
| 8,300,798 B1 * | 10/2012 | Wu et al. | 379/265.11 |
| 8,767,948 B1 | 7/2014 | Riahi et al. | |
| 2012/0321062 A1 | 12/2012 | Fitzsimmons et al. | |

\* cited by examiner

*Primary Examiner* — Quynh Nguyen
(74) *Attorney, Agent, or Firm* — McGuireWoods LLP

(57) ABSTRACT

A method for improving a call-participant behavior, the method includes receiving an intensity data signal and an intensity variation data signal related to an ongoing call, receiving a pitch data signal and a pitch variation data signal related to the ongoing call, receiving a tempo data signal and a tempo variation data signal related to the ongoing call, receiving a channel comparison data signal related to the ongoing call, generating a real-time call progress signal based on the intensity data signal, the intensity variation data signal, the pitch data signal, the pitch variation data signal, the tempo data signal, the tempo variation data signal, and the channel comparison data signal, and sending the real-time call progress signal to a user device.

17 Claims, 25 Drawing Sheets

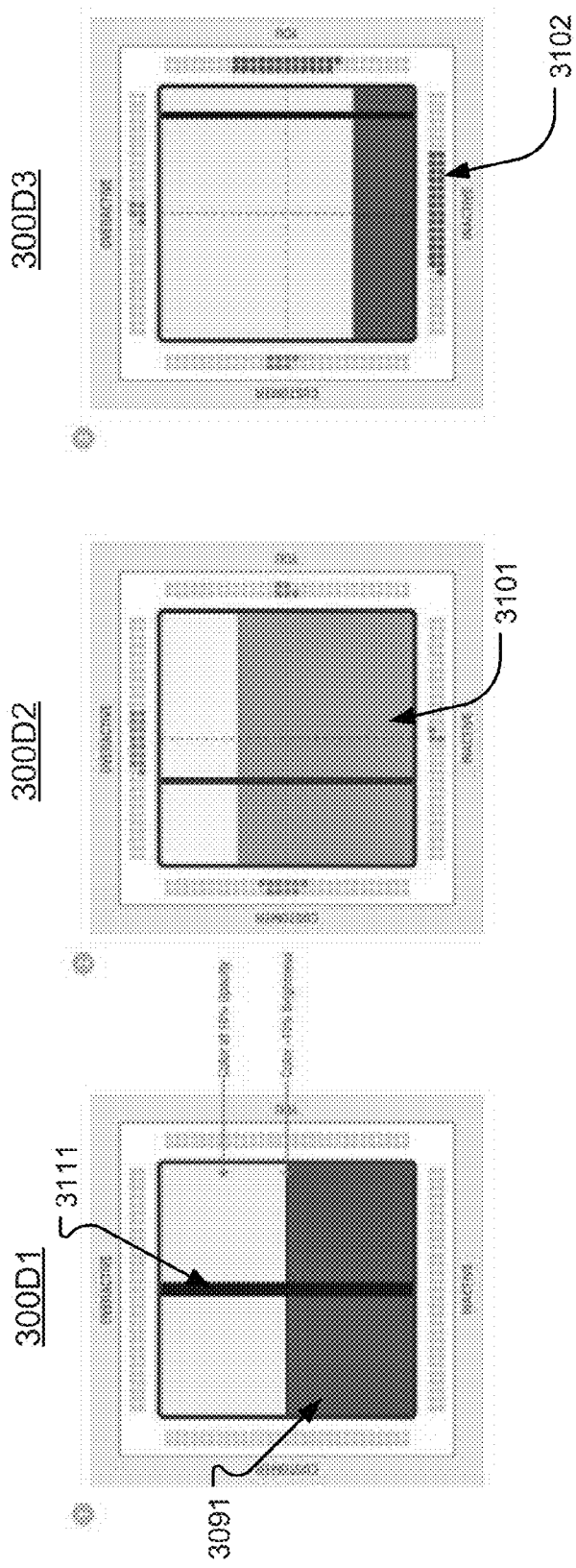

METHOD AND SYSTEM FOR IMPROVING CALL-PARTICIPANT BEHAVIOR THROUGH GAME MECHANICS

CROSS REFERENCE TO PRIOR APPLICATION

This application is a continuation of U.S. patent application Ser. No. 14/149,552, filed Jan. 7, 2014, scheduled to issue as U.S. Pat. No. 8,897,437 on Nov. 25, 2014, titled "Method and System for Improving Call-Participant Behavior Through Game Mechanics," which claims priority to and the benefit thereof from U.S. Provisional Patent Application No. 61/750,058, filed Jan. 8, 2013, titled "Method and System for Improving Call-Participant Behavior through Game Mechanics," the entirety of which are hereby incorporated herein by reference.

FIELD OF THE DISCLOSURE

The present disclosure relates generally to a system, a method and a computer program for improving call-participant behavior, and more specifically it relates to a system, a method and computer program for measuring and influencing call-participant behavior through analysis, feedback and game mechanics.

BACKGROUND OF THE DISCLOSURE

Front-line employee performance in industries such as, e.g., contact centers, is facing significant challenges, frequently resulting in poor on-call experience, lower overall productivity, absenteeism and ultimately high voluntary attrition, and so on. Existing technologies and methods for remedying these challenges tend to suffer from at least two issues. First, existing technologies and methods tend to measure outcomes versus behaviors. Second, the technologies and methods tend to reduce employee engagement.

For instance, existing technologies and methods tend to measure customer satisfaction, resolve rates, handle times and other factors after a call is complete, ignoring the complex behavioral dynamics that occur during a call. Further, increasing measurement, monitoring, and management and/or adding technology used to de-skill the front-line employee role (e.g., scripting and CRM systems) reduces the autonomy of the front-line employee experience, thereby further reducing employee engagement and ultimately increasing the challenges they were intended to address.

Speech analytics technologies are known that automate the monitoring of conversational quality through the use of speech-to-text transcription or other methods to spot verbal patterns of behavior and various forms of emotion detection in order to weight the evaluation of negative behavioral patterns. The reliability of speech-to-text systems, however, suffers from inaccuracies in the transcription, as well as ambiguities in verbal communication. Most speech-to-text systems deal with these inaccuracies by aggregating results and presenting them to supervisors. Some speech analytics solutions have the ability to provide information directly to front-line employees, but generally this information is provided post-conversation.

A commonly used method of improving the employee experience involves the use of contests and incentives to reward desirable behaviors. The specific methods used are highly varied, but the application of these types of "games" is pervasive in the contact center industry. The application of these types of games generally fails to create a sustained benefit because they do not address the underlying employee experience issue and the rewards used are subject to hedonic adaptation so they lose their effectiveness over time.

In order to address the root cause of, for example, common call center operational challenges, an unfulfilled need exists for a means to both measure and influence employee behavior without degrading the front-line employee experience or reducing autonomy.

SUMMARY OF THE DISCLOSURE

Accordingly, one aspect of the present disclosure provides a method for improving a call-participant behavior. The method includes receiving an intensity data signal and an intensity variation data signal related to an ongoing call, receiving a pitch data signal and a pitch variation data signal related to the ongoing call, receiving a tempo data signal and a tempo variation data signal related to the ongoing call, receiving a channel comparison data signal related to the ongoing call, generating a real-time call progress signal based on the intensity data signal, the intensity variation data signal, the pitch data signal, the pitch variation data signal, the tempo data signal, the tempo variation data signal, and the channel comparison data signal, and sending the real-time call progress signal to a user device.

The channel comparison data signal may include a talk-over data signal related to the ongoing call, a speaker dominance data signal related to the ongoing call, or a turn-taking data signal related to the ongoing call.

The method may further include receiving an intonation data signal related to the ongoing call, receiving an articulation data signal related to the ongoing call, receiving an accent data signal related to the ongoing call, and receiving an interruption data signal related to the ongoing call.

The method may further include the intonation data signal which is determined based on the pitch data signal, the articulation data signal which is determined based on at least one of the intensity data signal and the pitch data signal, and the accent data signal which is determined based on at least one of the intensity data signal, the pitch data signal, and the tempo data signal.

The method may further include receiving at least one of a noise data signal related to the ongoing call, a music data signal related to the ongoing call, an interruption data signal related to the ongoing call, and a voice stress data signal related to the ongoing call.

At least one of the noise data signal, the music data signal and the voice stress data signal may be determined based on at least one of the intensity data signal, the pitch data signal, and the tempo data signal.

The interruption data signal may be based on at least one of the intensity data signal, the pitch data signal, the tempo data signal and the talk-over data signal.

The method may further include generating a conversational balance data signal based on the channel comparison data signal, generating a conversational engagement data signal based on at least one of the channel comparison data signal and a conversational balance data signal, or generating a conversational experience data signal based on at least one of the channel comparison data signal, the conversational balance data signal, and the conversational engagement data signal.

The real-time call progress signal may include a sensory cue signal and a call progress report signal.

The sensory cue signal may include at least one of the following: a visual cue, an auditory cue, and a haptic cue.

The user device may include at least one of the following: a human user interface and a supervisor user interface.

According to another aspect of the present disclosure, a method for improving a call-participant behavior is provided, which includes receiving a voice analytics signal related to an ongoing call, and generating a real-time call progress signal based on the voice analytics signal, wherein the real-time call progress signal comprises at least one of: a sensory cue signal and a call progress report signal.

The method may include sending the sensory cue signal to a human user interface.

The method may further include sending the call progress report signal to a human user interface or a supervisor user interface.

The sensory cue signal may include at least one of the following: a visual cue, an auditory cue, and a haptic cue.

The voice analytics signal may further include an intensity data signal related to the ongoing call, an intensity variation data signal related to the ongoing call, a pitch data signal related to the ongoing call, a pitch variation data signal related to the ongoing call, a pitch confidence data signal related to the pitch data signal, a tempo data signal related to the ongoing call, a tempo variation data signal related to the ongoing call, and a channel comparison data signal related to the ongoing call.

The channel comparison data signal may include a talk-over data signal related to the ongoing call, a speaker dominance data signal related to the ongoing call, or a turn-taking data signal related to the ongoing call.

According to a further aspect of the present disclosure, a system for improving a call-participant behavior is provided. The system includes an intensity determiner that determines an intensity variance and an intensity related to an ongoing call, a pitch determiner that determines a pitch variance and a pitch related to the ongoing call, a pitch confidence determiner that determines a pitch confidence variance and a pitch confidence related to the determined pitch, a tempo determiner that determines a tempo and a tempo variance related to the ongoing call, a channel comparison determiner that compares multiple channels related to the ongoing call and determines a channel comparison data signal, a reporter that generates a real-time call progress signal based on at least one of the intensity, the intensity variance, the pitch, the pitch variance, the pitch confidence, the tempo, the tempo variance and the channel comparison data signal, and an interface that sends the real-time call progress signal to a user device.

The channel comparison determiner may include a talk-over determiner that determines talk-over related to the ongoing call, a speaker dominance determiner that determines speaker dominance related to the ongoing call, and a turn-taking determiner that determines turn-taking related to the ongoing call.

The system may further include a database that stores the real-time call progress signal.

The real-time call progress signal may include at least one of a sensory cue signal and a call progress report signal, wherein the sensory cue signal comprises a visual cue, an auditory cue, or a haptic cue.

The system may further include an intonation determiner that determines an intonation variance and an intonation related to the ongoing call, an articulation determiner that determines an articulation variance and an articulation related to the ongoing call, an accent determiner that determines an accent variance and accent related to the ongoing call, and an interruption determiner that determines an interruption variance and an interruption related to the ongoing call.

In an embodiment of the system according to the present disclosure, at least one of: the intonation may be determined based on the pitch, the articulation may be determined based on at least one of the intensity and the pitch, and the accent may be determined based on at least one of the intensity, the pitch, and the tempo.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIGS. 9A-9D show various views of another example of a graphical representation of the Human User Interface that is constructed in accordance with the principles of the disclosure.

Figure 1:
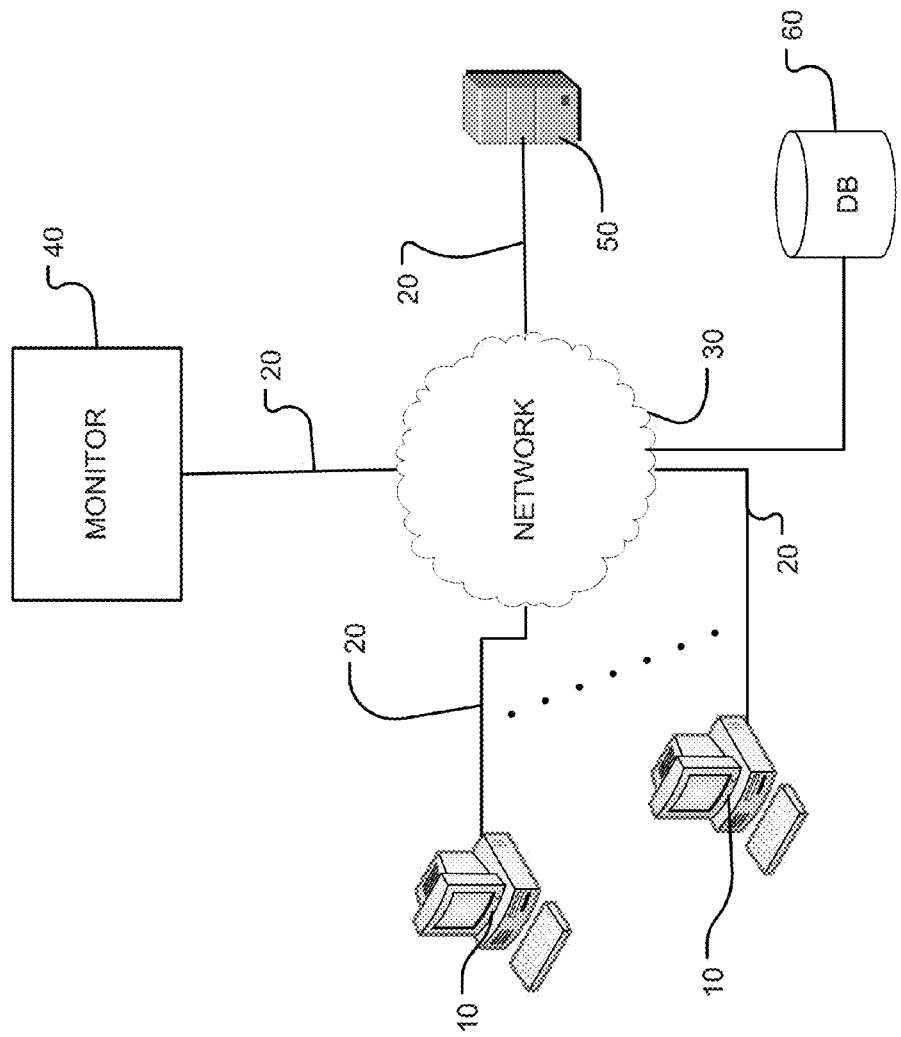
FIG. 1 shows an example of a system that measures and influences a person's behavior in accordance with the principles of this disclosure

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as any person skilled in the art would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure.

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a cloud, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "server," as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database," as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "communication link," as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like.

A "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, the cloud network, or the like, or any combination of the foregoing, any of which may be configured to communicate data via a wireless and/or a wired communication medium. These networks may run a variety of protocols not limited to TCP/IP, IRC or HTTP.

A "call-participant," as used in this disclosure means a person, such as, for example, but not limited to, an employee, a customer, a call-center employee, a student, a patient, and the like.

A "monitor," as used in this disclosure means a person (such as, for example, a call center supervisor, a manager, a teacher, an instructor, and the like), an expert system (such as, for example, a computer with artificial intelligence, a neural network, fuzzy logic, and the like), a computer, and the like.

An "action" as used in this disclosure means a corrective measure taken by a call-participant, a monitor or by a system component.

A "call metadata" as used in this disclosure means descriptive information about an analyzed conversation such as, for example, call start time, call end time, call origin, call destination, caller information, call-participant information, call type, call routing, call resolution, and the like.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable storage medium," as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium may include a "Cloud," which includes a distribution of files across multiple (e.g., thousands of) memory caches on multiple (e.g., thousands of) computers.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

After many years spent designing, measuring and managing call center operations, the applicant found that many of the operational issues that challenge call centers are rooted in employee behavior. Specifically, the applicant found that on-call behaviors, such as conversational engagement, could predict the efficiency, effectiveness, and quality of the customer experience where lower conversational engagement corresponded to longer handle times, lower resolve rates and lower customer satisfaction scores while higher engagement corresponded to shorter handle times, higher resolution rates, and higher customer satisfaction. Further, the applicant found that front-line employee engagement predicted conversational engagement in that less engaged employees were more likely to have less engaging conversations and in addition to poor on-call performance, lower employee engagement also predicted lower overall productivity, a higher probability for absenteeism and ultimately higher voluntary attrition. In order to address the root cause of common call center operational challenges, the present disclosure provides a method, a system, and a computer program that improves call-participant engagement using mechanisms of real-time measurement, assistance, and guided learning. The disclosed system and method can also influence behavior without further reducing the autonomy of the front-line employee experience such that front-line employee engagement is not degraded.

The disclosed method and system provide new solutions, including, measurement and analyses of the behavioral dynamics of conversation in real-time, and the provision of feedback designed to encourage or elicit self-explanations on the part of the employee to promote discovery-based learning and to aid their performance during, rather than a critique of their performance after the call. The disclosed method and system support an individual conversation by providing enhanced situational awareness, behavioral cueing and guided learning. This can assist a front-line employee in responding to the inherent uniqueness' of an individual encounter while also supporting a method of enhanced discovery-based learning. This may be incorporated within the context of a game that is played autonomously by the front-line employee for their benefit, in order to make their job less stressful and more fun. The disclosed method and system may also support an individual conversation though the use of verbal (written or recorded) cues that may be sent to the front-line employee, or to a supervisor or person that supports that front-line employee in order to provide additional support for that encounter.

Furthermore, the novel game mechanics enable the creation of a meta-experience that can transcend the call-to-call work experience. This meta-experience is designed to amplify positive events by providing dramatic positive feedback in response to desirable behaviors, while attenuating negative events by providing sensory feedback in response to certain customer behaviors. By manipulating the meta-experience, the game can be used to cultivate positive affect, motivate certain desirable behaviors and promote discovery-based learning to strategically address the operational issues encountered in the contact center by improving front-line employee engagement.

Real time feedback and behavioral reinforcement are provided to improve on-call engagement, naturally creating better call outcomes (e.g., improved customer experience) with greater operational efficiency (e.g., reduced handle time), and greater operational effectiveness (e.g., reduced transfer rate, reduced call back rate, and the like). Real time support also reduces up-front training costs by shifting soft-skills training from the classroom to the call where behaviors can be refined and adapted to suit an individual employee's communication style.

In addition to increasing engagement, gameplay introduces post-call feedback elements designed to periodically (and sometimes randomly) stimulate positive emotions (and therefore dopamine release) and mitigate negative emotions, badges designed to acknowledge achievement and/or mastery of work related behaviors, and communities designed to encourage social collaboration. These elements combine to stimulate positive emotions, increase work engagement, build social relationships, recognize accomplishment, and add another layer of meaning to the job. The introduction of these elements makes the job more fun and rewarding, which can ultimately improve job satisfaction and help reduce voluntary attrition.

Also within the scope of the present disclosure is a "gamified" system that can be developed using different analytics and a different system of rewards. For example, the analytics could rely on traditionally exposed operational metrics and not on uniquely derived on-call behavioral metrics, or they can be based on an assessment of the conversation based on speech-to-text measures. Reward systems can be designed differently using the same elements of game design, points, badges, leaderboards, challenges, accomplishments, collections, feedback, communities, and the like.

The system of the disclosure may generate event and/or alert messages based on the real-time detection of changes in conversational pattern and/or speaker affect as detectable through real-time prosodic analysis of conversations. For example, messages may be directed to the front-line employee, to supporting staff or supervisors or to another system component. The conversational patterns may identify risk triggering a support intervention on the part of a supervisor, or they may identify opportunity prompting a behavior (e.g. cross-sell offer) on the part of the employee.

Analysis algorithms may be initially "trained" based on post-hoc analysis of pre-recorded conversations. The corpus of prerecorded conversations may include both acted and actual calls collected from a call center operation. Algorithms may be refined to identify relevant features of a conversation (e.g. talking, silence, noise, voice stress) such that those features may contribute to higher order analytics. Those higher-order analytics comprise the real-time events that drive the behavior of the system. Once trained, algorithms can continue to self-optimize based on a revised corpus of call data comprising pre-recorded conversations as well as conversations observed by the system in production.

System provided (or generated) events may provide a probability of the occurrence of a detected behavior. These events may be analyzed in groups to detect the presence of other audibly detectable events. The system may generate a pre-call warm up e.g., games or signals to motivate or emotionally prime the call-participant for a call. In addition, the system may generate a post-call narrative based on a summary analysis of detected events. The post-call narrative may be stored in a database and may contain unique messages and instructional content catered to an individual outcome.

The system may be integrated with a front-end player interface to propagate a sensory (e.g., visual, sound, olfactory, taste, touch, and the like) cue signal feedbacks to a call-participant (e.g., a call-center employee) in timeframes sufficiently short to be relevant to a conversation in progress. The system game mechanics may also create an experience that can influence employee behavior and motivation. The call progress results can be stored in a database for future analysis for awards e.g., prizes, promotions, and so on. Furthermore, the system may be implemented in any application that may benefit from real-time analysis and feedback presented using game mechanics, including, for example, educational applications to treat children with learning disabilities (e.g., autism, dyscalculia, dyslexia, dysgraphia, attention-deficit/hyperactive disorder (ADHD), and the like), applications to teach people to learn a new language (e.g., Arabic, Chinese, English, French, German, Korean, Russian, Spanish, and so on), and the like.

The disclosure provides a system that has the ability to determine and report on a conversational experience, as well as a myriad of statistics that contribute to that determination, in real time based on voice analytics and conversational analytics. The system has the ability to affect the experience of a call-participant (e.g., frontline employee) through small and subtle behavioral nudges or other system actions. The behavioral nudges or system actions may include visual cues that are presented to a call-participant in real time. The system may use the conversational experience determining and reporting aspects together with the ability to affect the experience of a call-participant in a "gamified" context to affect the experience and long-term behavior of a call-participant through feedback (e.g., points, badges, achievements, and the like), skills development (e.g., challenges, guided learning, and the like), thematic elements (e.g., quests, personal avatars, and the like), and social elements (e.g., leaderboards, and the like).

The system may include a layering of analytics, starting with, e.g., single-channel statistics, moving into, e.g., derived statistics based on the single-channel statistics, and, then, combining channels to generate conversational analytics. The system may roll everything into higher-order analytics. Each layer may be more computationally complex than the previous layer, but each layer simplifies the delivery of information. For instance, intensity may be layered into voice stress and speaker dominance, which in turn may be layered into conversational engagement. The system may include four layers of analytics, including a frame statistics analytics layer, a derived statistics analytics layer, a combined channel analytics layer and a higher order analytics layer.

FIG. 1 shows an example of a system 100 that is constructed according to the principles of the disclosure. The system 100 is configured to measure and improve call-participant behavior in real-time. The system 100 includes one or more call-participant communication devices (e.g. a telephone, a computer or the like) 10, a network 30, a monitor computer 40, a server (or computer) 50, and a database 60, all of which may be coupled to each other via communication links 20. For example, the server 50 and the database 60 may be connected to each other and/or the network 30 via one or more communication links 20. The call-participant communication devices 10 and the monitor computer 40 may be coupled to the network 30 via communication links 20. The call-participant communication devices 10 may be used by, e.g., call center representatives, autistic child, a special needs children, and so on.

The call-participant communication devices 10, computer 40, server 50, and/or database 60 may include a computer-readable medium comprising a computer program that may be executed to carry out the processes disclosed herein. The computer-readable medium may include a code section or code segment for performing each step disclosed herein. The communication devices/computers 10 and 40 may include a display, a user interface (UI), a human user interface (HUI), a headset, a handset, a keyboard, a mouse, a touch display, a speaker, an earpiece, a microphone, and the like.

Figure 2:
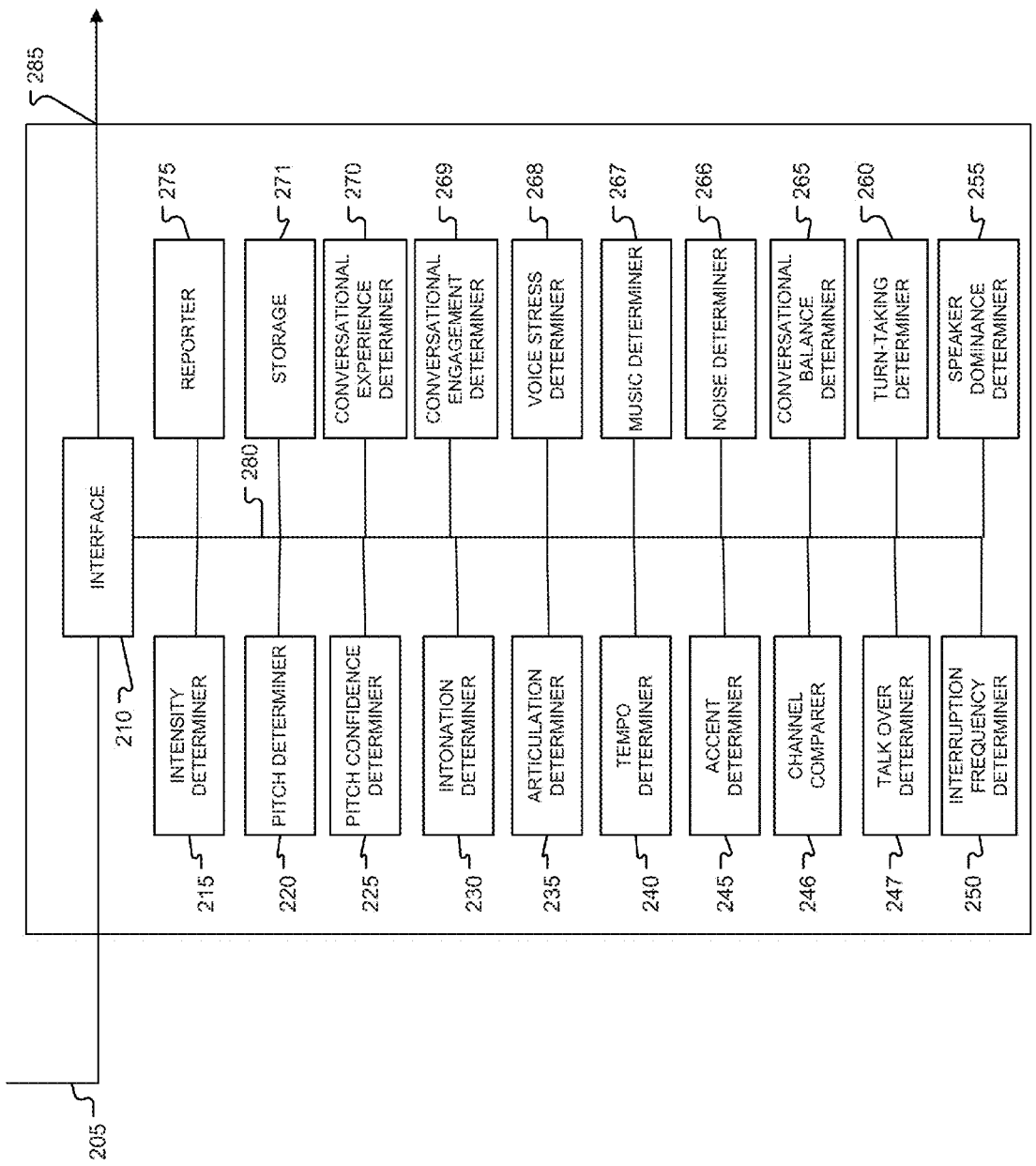
FIG. 2 shows an example of an analyzer system that is constructed according to the principles of the disclosure.

FIG. 2 shows an example of a sound analyzer 200 that is constructed according to the principles of the disclosure. The sound analyzer 200 is included in the system 100. For example, the sound analyzer 200 may be contained in the server 50. The sound analyzer 200 has an input that receives an ongoing call signal 205 from, e.g., the communication device 10 (shown in FIG. 1). The ongoing call signal 205 represents both the individual call participant's contribution to the conversation as well as the combined contribution, which represents the overall conversation. The sound analyzer 200 processes the individual components of the ongoing call signal 205 using, e.g., frame analytics as well as the combined channels of the ongoing call signal 205 using, e.g., conversational systematics and generates a real-time call progress signal 285, which it outputs at an output of the sound analyzer 200. The ongoing call signal 205 may be analyzed, e.g., as individual channels and/or as a combined conversation.

Referring to FIG. 2, the sound analyzer 200 may include an interface 210, an intensity determiner 215, a pitch determiner 220, a pitch confidence determiner 225, an intonation determiner 230, an articulation determiner 235, a tempo determiner 240, an accent determiner 245, channel comparer 246, a talk over determiner 247, an interruption frequency determiner 250, a speaker dominance frequency (or whosetime) determiner 255, turn-taking determiner 260, a conversational balance determiner 265, a noise determiner 266, a music determiner 267, a voice stress determiner 268, a conversational engagement determiner 269, a conversational experience determiner 270, a storage 271, and a reporter 275, all of which may be connected to each other via a bus 280. The values determined by each of the components (e.g., 215 through 270 and 275 in FIG. 2) may be stored locally in the storage 271 and/or output via interface 210 to a remote database (e.g., database 60 shown in FIG. 1) for storage.

The interface 210 may include an input/output (I/O) interface that is configured to manage and facilitate communication between components within the sound analyzer 200, as well as communication into and out of the sounder analyzer 200.

The intensity determiner 215 determines and analyzes the intensity levels (or amplitude or loudness) of the ongoing call signal 205 as a function of time. For instance, the intensity determiner 215 may implement a sampling method (e.g., Nyquist sampling) to sample the ongoing call signal 205 at discrete intervals and store the intensity (or amplitude) level for each sample. The intensity determiner 215 may also compare intensity levels of the ongoing signal 205 to a minimum threshold value to determine silent periods or pauses in the ongoing call signal 205, including pauses between utterances. The intensity determiner 215 may be configured to correlate and associate portions of the ongoing call signal 205 with each participant in the call creating a channel-separated statistic, as is known by those skilled in the art. The intensity levels for all (or a portion of all) of the samples for a particular call (or a portion of the call) signal, as well as the occurrence of silent periods or pauses, may be buffered and stored in the intensity determiner 215.

The intensity determiner 215 analyzes intensity variance between samples (and/or groups of samples) in the ongoing call signal 205 to determine intensity variance values. The intensity determiner 215 may analyze intensity variance between samples obtained from the ongoing call signal 205 and correlate the intensity variance values with baseline intensity variance values, which may be obtained, e.g., from the storage 271 and/or database 60 (shown in FIG. 1). The baseline intensity variance values may be derived from a previously stored call signal. The baseline intensity variance values may be determined from historical intensity variance value data that is derived from many previous calls that were received and processed by the sound analyzer 200. The previously stored call signal may be associated with the same person calling the call center, or associated with one or more of the parameters provided in the call metadata.

The pitch determiner 220 determines and analyzes the pitch (or frequency) of the ongoing call signal 205 as a function of time. For instance, the pitch determiner 220 may include a time to frequency transform (e.g., a fast Fourier transform (FFT)) to convert the ongoing call signal 205 to the frequency domain. The pitch determiner 220 may be configured to correlate and associate portions of the ongoing call signal 205 with each participant in the call creating a channel-separated statistic, as is known by those skilled in the art. The pitch determiner 220 may analyze the ongoing call signal 205 and determine the frequency at discrete intervals and store the pitch (or frequency) value for each sample. The pitch values for all (or a portion of all) of the samples for a particular call (or a portion of the call) signal may be buffered and stored in the pitch determiner 220.

The pitch determiner 220 analyzes the pitch (or frequency) for each of the samples and determines a pitch variance over time for the ongoing call signal 205. The pitch determiner 220 may analyze pitch values between samples (or groups of samples) obtained from the ongoing call signal 205. The pitch determiner 220 may be configured to correlate and associate portions of the ongoing signal 205 with each participant in the call creating a channel-separated statistic, as is known by those skilled in the art. The pitch determiner 220 may analyze pitch values and pitch variance values obtained from the ongoing call signal 205 and correlate the values with baseline pitch variance values, which may be obtained, e.g., from the storage 271 and/or database 60 (shown in FIG. 1). The baseline pitch variance values may be derived from a previously stored call signal. The baseline intensity variance values may be determined from historical pitch variance value data that is derived from many previous calls that were received and processed by the sound analyzer 200. The previously stored call signal may be associated with the same person calling the call center, or associated with one or more of the parameters provided in the call metadata.

The pitch confidence determiner 225 determines and analyzes the pitch confidence level and pitch confidence variance of the ongoing call signal 205 as a function of time. For instance, the pitch confidence determiner 225 may include time to frequency transformer (e.g., a fast Fourier transform (FFT)) to convert the ongoing call signal 205 to the frequency domain. The pitch confidence determiner 225 may analyze the distribution of energy across the frequency spectrum of the ongoing call signal 205 over time, or variances in pitch or harmonics over time, to find breakpoints in the ongoing call signal 205 in order to separate the signal into distinct tones. The pitch confidence determiner 225 may associate a pitch confidence level for each breakpoint and/or note extracted from the ongoing call signal 205. United States patent application publication no. 2008/0148924 to Chi-Ying Tsui et al. discloses an example of a pitch confidence determiner in FIG. 2 of the published patent application. The pitch confidence determiner 225 may be configured to correlate and associate portions of the ongoing call signal 205, with the understanding that pitch confidence may be a channel-separated statistic, as is known by those skilled in the art. The pitch confidence levels for all (or a portion of all) of the samples for a particular call (or a portion of the call) signal may be buffered and stored in the pitch confidence determiner 225.

The intonation determiner 230 determines and analyzes intonations in the ongoing call signal 205 as a function of time. The intonation determiner 230 analyzes variations in intonation and pitch in the ongoing call signal 205 as a function of time to determine intonation variances. The intonation determiner 230 is configured to indicate an attitude or emotion of the speaker, and identify differences between a statement, a question, and the types of statements or questions. The intonation determiner 230 may also be configured to correlate and associate portions of the ongoing call signal 205 with each participant in the call creating a channel-separated statistic, as is known by those skilled in the art. The intonation values and intonation variation values for groupings of the samples for the particular call (or a portion of the call) signal may be buffered and stored in the intonation determiner 230.

The articulation determiner 235 determines and analyzes articulation in the ongoing call signal 205 as a function of time. The articulation determiner 235 may include, e.g., articulatory speech recognition, as is known in the art, that analyzes each sound and silent period in the ongoing call signal 205. The articulation determiner 235 analyzes the articulation of the sound signals in the ongoing call signal 205 and determines articulation variations in the signal over time. The articulation determiner 235 may be configured to correlate and associate portions of the ongoing call signal 205 with each participant in the call creating a channel-separated statistic, as is known by those skilled in the art. The articulation values and articulation variation values for groupings of samples of the particular call (or portion of the call) signal may be buffered and stored in the articulation determiner 235.

The tempo determiner 240 determines and analyzes the tempo in the ongoing call signal 205 as a function of time. The tempo determiner 240 may identify intensity peaks in the ongoing call signal 205, as is known in the art, and analyze the intensity peaks to determine tempo values for the ongoing call signal 205, as well as tempo variance values as a function of time. The tempo determiner 240 is configured to indicate a tempo of the sound signal as a function of time. The tempo determiner 240 may be configured to correlate and associate portions of the ongoing call signal 205 with each participant in the call creating a channel-separated statistic, as is known by those skilled in the art. The tempo values and tempo variation values for groupings of the samples for the particular call (or a portion of the call) signal may be buffered and stored in the tempo determiner 240.

In addition, the tempo determiner 240 may analyze tempo values between samples (or groups of samples) obtained from the ongoing call signal 205. The tempo determiner 220 may also analyze tempo values and tempo variance values obtained from the ongoing call signal 205 and correlate the values with baseline tempo variance values, which may be obtained, e.g., from the storage 271 and/or database 60 (shown in FIG. 1). The baseline tempo variance values may be derived from a previously stored call signal. The baseline tempo variance values may be determined from historical tempo variance value data that is derived from many previous calls that were received and processed by the sound analyzer 200. The previously stored call signal may be associated with the same person calling the call center, the same employee participating in the call, or associated with one or more of the parameters provided in the call metadata.

The accent determiner 245 determines and analyzes accent in the ongoing call signal 205 as a function of time. The accent determiner 245 may determine and analyze, for example, stress (or dynamic) accent, pitch accent, and quantitative accent, as is known in the art, to determine accent for sounds in the ongoing call signal 205. The accent determiner 245 may be configured to correlate and associate portions of the ongoing call signal 205 with each participant in the call creating a channel-separated statistic, as is known by those skilled in the art. The accent determiner 245 may analyze variances in the accent in the ongoing call signal 205 over time to determine accent variance. The accent values and accent variation values for groupings of the samples for the particular call (or a portion of the call) signal 205 may be buffered and stored in the accent determiner 245.

In addition, the accent determiner 245 may also analyze the accent for each of the samples and determines an accent variance over time for the ongoing call signal 205. The accent determiner 245 may also analyze accent values between samples (or groups of samples) obtained from the ongoing call signal 205. The accent determiner 220 may analyze accent values and accent variance values obtained from the ongoing call signal 205 and correlate the values with baseline accent variance values, which may be obtained, e.g., from the storage 271 and/or database 60 (shown in FIG. 1). The baseline accent variance values may be derived from a previously stored call signal. The baseline accent variance values may be determined from historical accent variance value data that is derived from many previous calls that were received and processed by the sound analyzer 200. The previously stored call signal may be associated with the same person calling the call center, the same employee participating in the call, or associated with one or more of the parameters provided in the call metadata.

The channel comparer 246 analyzes and compares, e.g., audio frames in two or more channels in the signal 205 and generates a data stream. The channel comparer 246 compares multiple call-participant call signals (or channels) and outputs comparison information that may be used by multi-channel determiners. For instance, the channel comparer may compute and compare audio frames from two or more channels, including frame values, such as, e.g., intensity, pitch, intonation, tempo, time series merge history, and the like.

The talk over determiner 247 determines and analyzes simultaneous speaking on the part of multiple call participants. The talk over determiner 247 may determine and analyze for example, acknowledgements (e.g. uh-huh) or back channeling as it is known, to determine that a call participant is actively listening. The talk over determiner 247 may also determine and analyze attempts by one call participant to seize the conversational floor. The talk over determiner 247 may be configured to correlate and associate portions of the ongoing call signal 205 with each participant in the call, so as to determine when the particular speaker talks over (or is talked over) in the call. The talk over may be detected based on, e.g., variations in signal amplitude and frequency as a function of time, as well as the length of time during which two or more speakers are speaking simultaneously. The talk over determiner 247 may determine variations in talk over occurrence over time. The interruption frequency values for groupings of the samples for the particular call (or a portion of the call) signal 205 may be buffered and stored in the talk over determiner 247.

The interruption frequency values for groupings of the samples for the particular call (or a portion of the call) signal 205 may be buffered and stored in the interruption frequency determiner 250. The interruption frequency determiner 250 analyzes an interruption frequency related to the ongoing call signal 205. In particular, the interruption frequency determiner 250 analyzes the ongoing call signal 205 to determine when a particular speaker is speaking and when the particular speaker is interrupted by (or interrupts) another speaker. The interruption frequency determiner 250 may be configured to correlate and associate portions of the ongoing call signal 205 with each participant in the call, so as to determine when the particular speaker interrupts (or is interrupted) in the call. The interruption may be detected based on, e.g., variations in signal amplitude and frequency as a function of time, as well as the voice signatures of the speakers to determine when an interruption occurs and the length of time during which two or more speakers are speaking simultaneously.

The interruption frequency determiner 250 may determine the interruption frequency by taking the number of interruptions for a selected interval of time (e.g., a portion of, or the entire call) and dividing it by the predetermined time period to determine the interruption frequency for the particular caller. The interruption frequency determiner 250 may determine variations in interruption over time. The interruption frequency values for groupings of the samples for the particular call (or a portion of the call, or channel within the call) signal 205 may be buffered and stored in the interruption frequency determiner 250. Similarly, interruption frequency variation values for groupings of the samples for the particular call (or a portion of the call) signal 205 may be buffered and stored in the interruption frequency determiner 250.

The speaker dominance determiner 255 analyzes speaker dominance in the ongoing call signal 205. In particular, the speaker dominance determiner 255 analyzes the ongoing call signal 205 to determine when a particular speaker is speaking or holds the conversational floor and the duration during which either of those conditions occur. The speaker dominance determiner 255 may also consider silent periods or pauses in the ongoing call signal 205, including pauses between words, as well as pauses between speakers. The speaker dominance determiner 255 may receive the interruption information from the interruption frequency determiner 250. The speaker dominance determiner 255 may be configured to correlate and associate portions of the ongoing call signal 205 with each participant in the call, so as to determine when the particular speaker is holds the conversational floor and for how long. The speaker dominance determiner 250 also analyzes and determines variations in the speaker's conversational floor time during the call. The speaker dominance values and speaker dominance variation values for groupings of the samples for the particular call (or a portion of the call) signal 205 may be buffered and stored in the speaker dominance determiner 255.

The turn-taking determiner 260 analyzes turn taking by the speakers in the ongoing call signal 205. In particular, the turn-taking determiner 260 analyzes the ongoing call signal 205 to determine when each speaker is speaking in the ongoing call signal, and each time that a transition occurs from one speaker to the next speaker. The turn-taking determiner 260 may consider silent periods or pauses between speakers in the ongoing call signal 205. The turn-taking determiner 260 may also consider when the particular speaker is interrupted by (or interrupts) another speaker. The turn-taking determiner 260 may receive the interruption information from the interruption frequency determiner 250. The turn-taking determiner 260 may be configured to correlate and associate portions of the ongoing call signal 205 with each participant in the call, so as to determine when the particular speaker takes a turn, how long that turn lasts, the number of times the speaker takes turns relative to another speaker in the same conversation. The turn-taking determiner 260 also analyzes and determines variations in turn taking by the speakers during the call. The turn-taking values and turn-taking variation values for groupings of the samples for the particular call (or a portion of the call) signal 205 may be buffered and stored in the turn-taking determiner 260.

The conversational balance determiner 265 analyzes the symmetry of the ongoing call signal 205. In particular, the conversational balance determiner 265 analyzes the ongoing call signal 205 to determine how symmetrical or unsymmetrical a conversation appears based on various factors e.g., intensity, intensity variation, pitch variation, tempo, turn-taking, talk-over, silence, accent, intonation, and the like, as measured across each of the participants in a conversation. The speaker conversation determiner 265 may receive the information from determiners 215-260, 266-270. The speaker conversation determiner may also correlate and associate portions of the ongoing call signal 205 with each participant in the call, so as to associate portions of the ongoing call signal 205 with each participant in the call, so as to determine when a conversation has become asymmetrical. The conversational balance determiner 265 may also analyze and determine variations in the conversational balance during the call. The conversational balance values and speaker variation values for groupings of the samples for the particular call (or a portion of the call) signal 205 may be buffered and stored in the conversational determiner 265.

The noise determiner 266 determines and analyzes the occurrence of noise (intermittent or sustained) within the ongoing call signal 205. For instance, the noise determiner 266 may identify that a component of the ongoing call signal 205 is not related to a call participant's speaking Noise may be detected based on, e.g., variations in signal energy, frequency, or harmonics, as well as the baseline voice signatures of the speakers to determine when a component of the ongoing call signal 205 is noise. The noise determiner 266 may be configured to correlate and associate portions of the ongoing call signal 205 with each participant in the call. The noise determiner 266 may analyze the ongoing call signal 205 and determine the occurrence of noise at discrete intervals and store that occurrence (or frequency) value for each sample. The noise values for all (or a portion of all) of the samples for a particular call (or a portion of the call) signal may be buffered and stored in the noise determiner. Those skilled in the art will recognize and understand that noise determiner technology used in mobile cellular telephones may be included in the noise determiner 266.

The music determiner 267 determines and analyzes the occurrence of music within the ongoing call signal 205. For instance, the music determiner 267 may identify that the ongoing call signal 205 no longer represents a call participant's speaking, but rather represents music. Music may be detected based on, e.g., variations in signal energy, frequency, or harmonics, as well as the baseline voice signatures of the speakers to determine when a component of the ongoing call signal 205 is music. The music determiner 267 may be configured to correlate and associate portions of the ongoing call signal 205 with each participant in the call. The music determiner 267 may analyze the ongoing call signal 205 and determine the occurrence of music at discrete intervals and store that occurrence (or frequency) value for each sample. The music values for all (or a portion of all) of the samples for a particular call (or a portion of the call) signal may be buffered and stored in the music determiner. Music determiners are well known in the mobile cellular field, any of which may be used herein, as those skilled in the art will recognize and understand.

The voice stress determiner 268 determines and analyzes voice stress in the ongoing call signal 205 as a function of time. The voice stress determiner 268 analyzes variations in intensity, intonation, pitch, articulation, tempo and pitch confidence of the ongoing call signal 205 as a function of time to determine voice stress variances. The voice stress determiner 268 may be configured to indicate tension in the voice of the speaker to highlight certain emotional states. The voice stress determiner 268 may receive information from the determiners 215-267, 269. The voice stress determiner 268 may also be configured to correlate and associate portions of the ongoing call signal 205 with each participant in the call creating a channel-separated statistic, as is known by those skilled in the art. The voice stress values and voice stress variation values for groupings of the samples for the particular call (or a portion of the call) signal may be buffered and stored in the voice stress determiner 268.

The conversational engagement determiner 269 determines and analyzes the level and quality of participant activity in the ongoing call signal 205 as a function of time. The conversational engagement determiner 269 analyzes interactivity using intensity, silence, speaker dominance, turn-taking, talk over, interruption and the like from the ongoing call signal 205 as a function of time. The conversational engagement determiner 269 is configured to indicate a continuous range of interactivity. The conversational engagement determiner 269 may receive information from determiners 215-260. The conversational engagement values and conversational engagement variation values for groupings of the samples for the particular call (or a portion of the call) signal may be buffered and stored in the conversational engagement determiner 269.

The conversational experience determiner 270 determines and analyzes the overall quality and character of the ongoing call signal 205 as a function of time. The conversational experience determiner 270 may analyze determined values such as, for example, conversational balance, conversational engagement, and voice stress and the like from the ongoing call signal 205 to assess the overall quality and character of the interaction as a function of time. The conversational experience determiner 270 is configured to indicate a continuous range of interactivity. The conversational experience determiner 270 may receive information from determiners 215-269. The conversational experience values and conversational experience variation values for groupings of the samples for the particular call (or a portion of the call) signal may be buffered and stored in the conversational experience determiner 270.

The conversational systematics values and variance values obtained from one or more of the components 215 to 270 may be used to determine energy levels for each speaker, energy level differences between speakers, time occupied by each speaker, acknowledgements made by each speaker (e.g., "uh-uh"), time between spoken words for each caller, time between speakers, and the like, and variations of the foregoing during the call in the ongoing call signal 205.

Each of the components 215 to 270 may correlate determined conversational systematics values (and/or variance values) with baseline values obtained, e.g., from the storage 271 and/or database 60 (shown in FIG. 1), similar to the manner in which, e.g., the pitch determiner 220 analyzes pitch values and pitch variance values obtained from the ongoing call signal 205 and correlates the values with baseline pitch variance values. The baseline values may be derived from one or more previously stored calls. The baseline values may be determined from historical data that is derived from a large number of calls that were received and processed by the sound analyzer 200. The previously stored call signal(s) and/or historical data may be associated with the same person calling the call center, the same call-representative on the call, and/or one or more of the other parameters provided in the call metadata.

The reporter 275 is in communication with the components 210 through 271 by means of the bus 280. Similarly, all of the components 210-275 are in communication with each other by means of bus 280. The raw analytics created by the components 215-270 are consumed by other higher-order algorithms in the reporter 275 which are designed to simplify the determination of appropriate actions based on analyzed conversational systematics. Specifically, the determiners 215-270 support the derivation of conversational balance (which incorporates things like, e.g., intensity variation between channels, tempo variation between channels, turn-taking, speaker domination, and intonation), conversational engagement (which incorporates things like, e.g., talk over, interruption, and tempo) and overall experience (which incorporates, e.g., elements of conversational balance, conversational engagement, pitch, pitch confidence, intonation, articulation, tempo and accent). Balance, engagement and experience may be the three statistics that drive the behavior of the visual cue (e.g., shown in FIG. 5A). The reporter 275 may be in communication with additional components (not shown), such as, e.g., a conversational balance determiner that determines balance in speaking time between the call-participants, a noise determiner that determines noise in the call signal, a music determiner that determines music in the call signal, a voice stress determiner that determines a stress level in the call-participant's voice, and a conversational engagement determiner that determines the conversational engagement of the call-participants, all of which may be included in the sound analyzer 200.

The reporter 275 is configured to determine call metadata for each call. The call metadata may include, for example, call-participant information, a call start time, a call end time, and the like. The call-participant information may include any information that may be helpful in identifying the call-participants in the call, including, e.g., a name, a telephone number, an address, an email address, a geographic location, a social security number, an account number, an employee number, a call-representative number, a bank account number, a customer number, a credit card number, an education level, an education history, a credit score, or any other identifying information related to the call-participants. The call-participants may include, for example, a person who calls a call center and the call-representative that answers the call.

The reporter 275 may access and retrieve historical call information from, e.g., the local storage 271, or from the server 50 and/or database 60 (shown in FIG. 1) via the interface 210 and communication links 20. The reporter 275 may also send call information for the ongoing call to the local storage and/or the server 50 and/or database 60, where the call information may be stored long-term. The historical call information may include, for example, previously recorded calls associated with the call metadata and call information related to the call metadata. The call information may include, for example, conversational systematics (or call analytics) data, which may include, for example, intensity and/or intensity variation data, pitch and/or pitch variation data, pitch confidence and/or pitch confidence variation data, intonation and/or intonation variation data, articulation and/or articulation variation data, tempo and/or tempo variation data, accent and/or accent variation data, interruption and/or interruption variation data, speaker dominance and/or speaker dominance variation data, and turn-taking and/or turn-taking variation data.

The reporter 275 receives, as inputs, call analytics data signals from one or more of the components 210 to 270 over the bus 280. The reporter 275 processes the received call analytics data and generates a real-time call progress signal 285, as is described in greater detail below. The real-time call progress signal 285 is sent to the call-participant communication device 10 (or the monitor computer 40), or to another system component over the communications links 20. The real-time call progress signal 285 may be conveyed to the call participant at the communication device 10 via sensory cue signals e.g., a visual cue, an auditory cue, a haptic cue, an olfactory cue, and an environmental cue.

The real-time call progress signal 285 may also be sent to the monitor computer 40, where a monitor may observe and monitor the call-participant's performance and progress on a call in real-time. The monitor computer 40 may include a Supervisor User Interface (SUI) 400, as described below.

The components 210 through 270 and 275 in FIG. 2 may be formed as individual and separate hardware units, such as, for example, integrated circuit (IC) chips, application specific integrated circuits (ASICs), and the like. Alternatively (or additionally), the sound analyzer 200, including the components 210 through 270 and 275 may be formed as a digital signal processor (DSP) that carries out the respective function of each component (210-270, 275). In this regard, the components 210 through 270 and 275 in the DSP may each include a software module that carries out the respective function.

The sound analyzer 200, including components 215-270 and 275, may include artificial intelligence (AI), such as, e.g., an expert system, a neural network, fuzzy logic, and the like. In this regard, historical call information may be used to train the components, as is known by those skilled in the AI art.

The above-mentioned components 215-270 and 275 may analyze the ongoing call signal 205 consecutively or simultaneously, or a mixture of both. The analyses carried out by the components 215-270 and 275 may be based on baseline data that may be stored in the storage 271, the server 50 and/or the database 60, as discussed above. That is, the baseline data may include historical call information and/or baseline analytics data. As noted earlier, the baseline analytics data may include, e.g., an intensity variation baseline value, a pitch variation baseline value, a pitch confidence variation baseline value, an intonation variation baseline value, an articulation variation baseline value, a tempo variation baseline value, an accent variation baseline value, a noise baseline value, a music baseline value, a voice stress baseline value, an interruption baseline value and/or an interruption variation baseline value, a speaker dominance baseline value and/or a speaker dominance variation baseline value, and a turn-taking baseline value and/or a turn-taking variation baseline value, a conversational balance baseline value and/or a conversational balance variation baseline value, a conversational engagement baseline value and/or and conversational engagement variation baseline value, and a conversational experience baseline value and/or and conversational experience variation baseline value.

Figure 3:
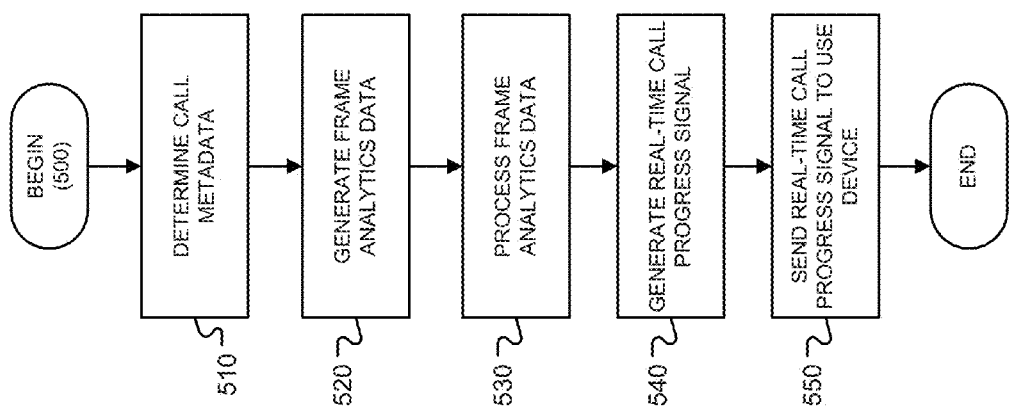
FIG. 3 is a flow chart illustrating a method for measuring and influencing a person's behavior in accordance with the principles of the disclosure.

FIG. 3 illustrates a flow diagram of a method 500 for measuring and influencing a call-participant's behavior in accordance with the principles of the disclosure. Referring to FIGS. 2 and 3 concurrently, initially the reporter 275 detects an initiation of a call session and determines call metadata for the call (Step 510). The sound analyzer 200 receives and analyzes the ongoing call signal 205 and generates frame analytics data, based on the ongoing call signal 205 data (Step 520). In this regard, the sound analyzer 200 may receive audio sub frames (e.g., 16 ms in length) and carry out parallel processing and analysis of the ongoing call signal 205, as described in greater detail below with reference to FIGS. 4A, 4B, and generate signals within, e.g., milliseconds of any significant change in the analyzed audio data.

The reporter 275 receives the frame analytics data and processes the frame analytics data (Step 530). The reporter 275 may also derive additional analytics data mentioned above including noise, music and voice stress data, and the reporter 275 may compare data from multiple call-participants to generate conversational analysis data including talk-over, interruption, turn-taking and dominance data. The reporter 275 may compare the received analytics data to baseline analytics data, which it may access and retrieve from the storage 271 and/or database 60 (or server 50). As noted earlier, the baseline analytics data may include, e.g., an intensity variation baseline value, a pitch variation baseline value, a pitch confidence variation baseline value, an intonation variation baseline value, an articulation variation baseline value, a tempo variation baseline value, an accent variation baseline value, an interruption baseline value and/or an interruption variation baseline value, a speaker dominance baseline value and/or a speaker dominance variation baseline value, and a turn-taking baseline value and/or a turn-taking variation baseline value.

On the basis of the processed data, including frame analytics data, derived analytics data, and conversational analysis data, the reporter 275 may generate the higher-order analytics data mentioned above, including, e.g., engagement data, balance data and conversational experience data. The reporter 275 may utilize certain higher-order analytics data (such as, e.g. conversation engagement data) to contribute to the generation of other higher-order analytics data (e.g. conversational experience data, the generation of which may be supported by conversational engagement data). The reporter 275 may compare the received analytics data to baseline analytics data, which it may access and retrieve from the storage 271 and/or database 60 (or server 50). As noted earlier, the baseline analytics data may include, e.g., an intensity variation baseline value, a pitch variation baseline value, a pitch confidence variation baseline value, an intonation variation baseline value, an articulation variation baseline value, a tempo variation baseline value, an accent variation baseline value, a noise baseline value, a music baseline value, a voice stress baseline value, an interruption baseline value and/or an interruption variation baseline value, a speaker dominance baseline value and/or a speaker dominance variation baseline value, and a turn-taking baseline value and/or a turn-taking variation baseline value, a conversational balance baseline value and/or a conversational balance variation baseline value, a conversational engagement baseline value and/or and conversational engagement variation baseline value, and a conversational experience baseline value and/or and conversational experience variation baseline value. The reporter 275 generates a real-time call progress signal 285 (Step 540) which may include frame analytics, derived per-channel analytics, conversational analytics and higher-order conversational experience analytics. The real-time call progress signal 285 may be sent to, e.g., the communication device 10 and/or the monitor computer 40 (Step 550), and/or to another system component. Additionally, the real-time call progress signal 285 may be sent to, e.g., the server 50 and/or database 60.

Figure 4A:
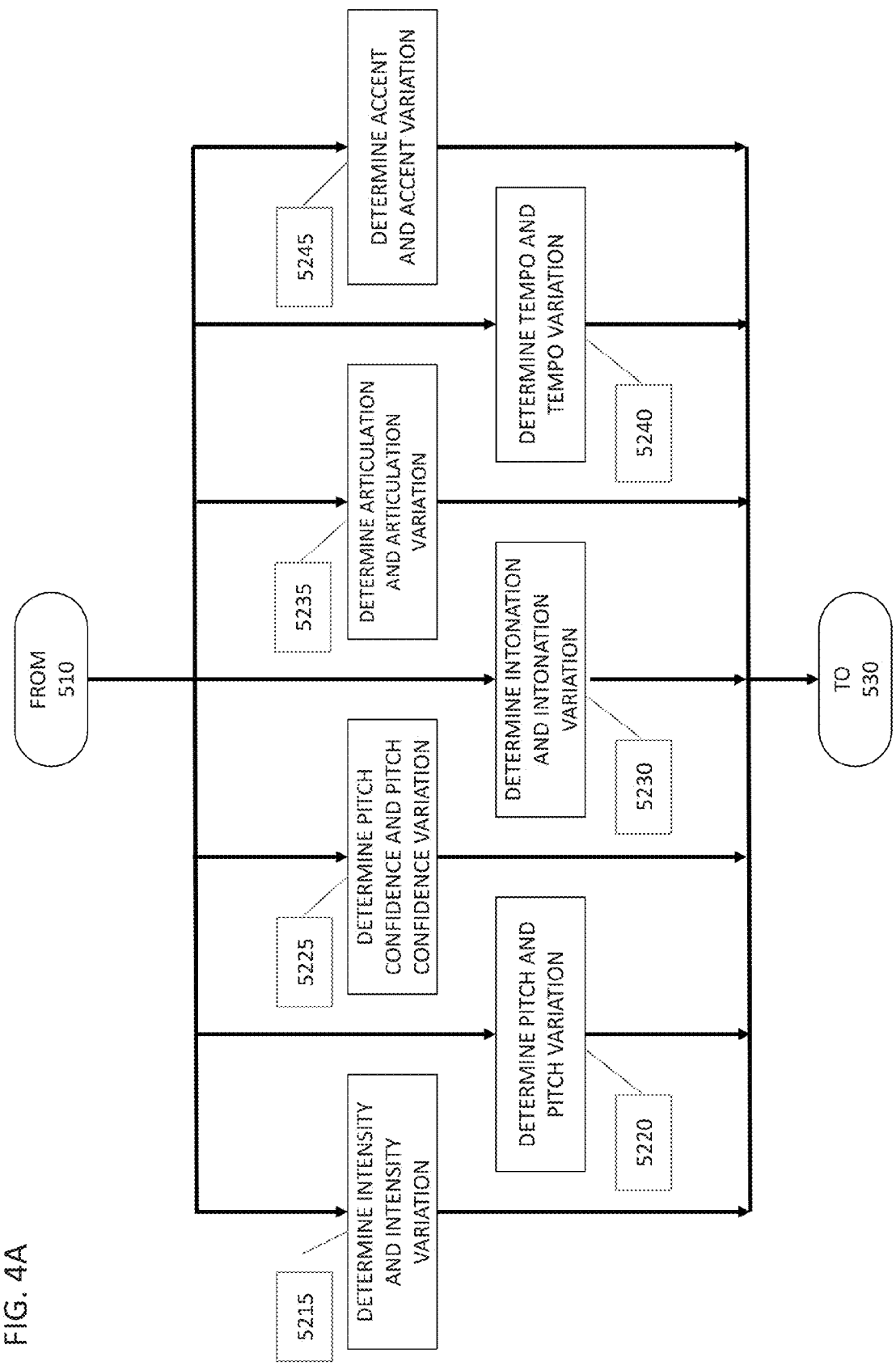
FIGS. 4A-4C are flow charts illustrating a process that may be carried out in the method of FIG. 3, in accordance with the principles of the disclosure.
Figure 4B:
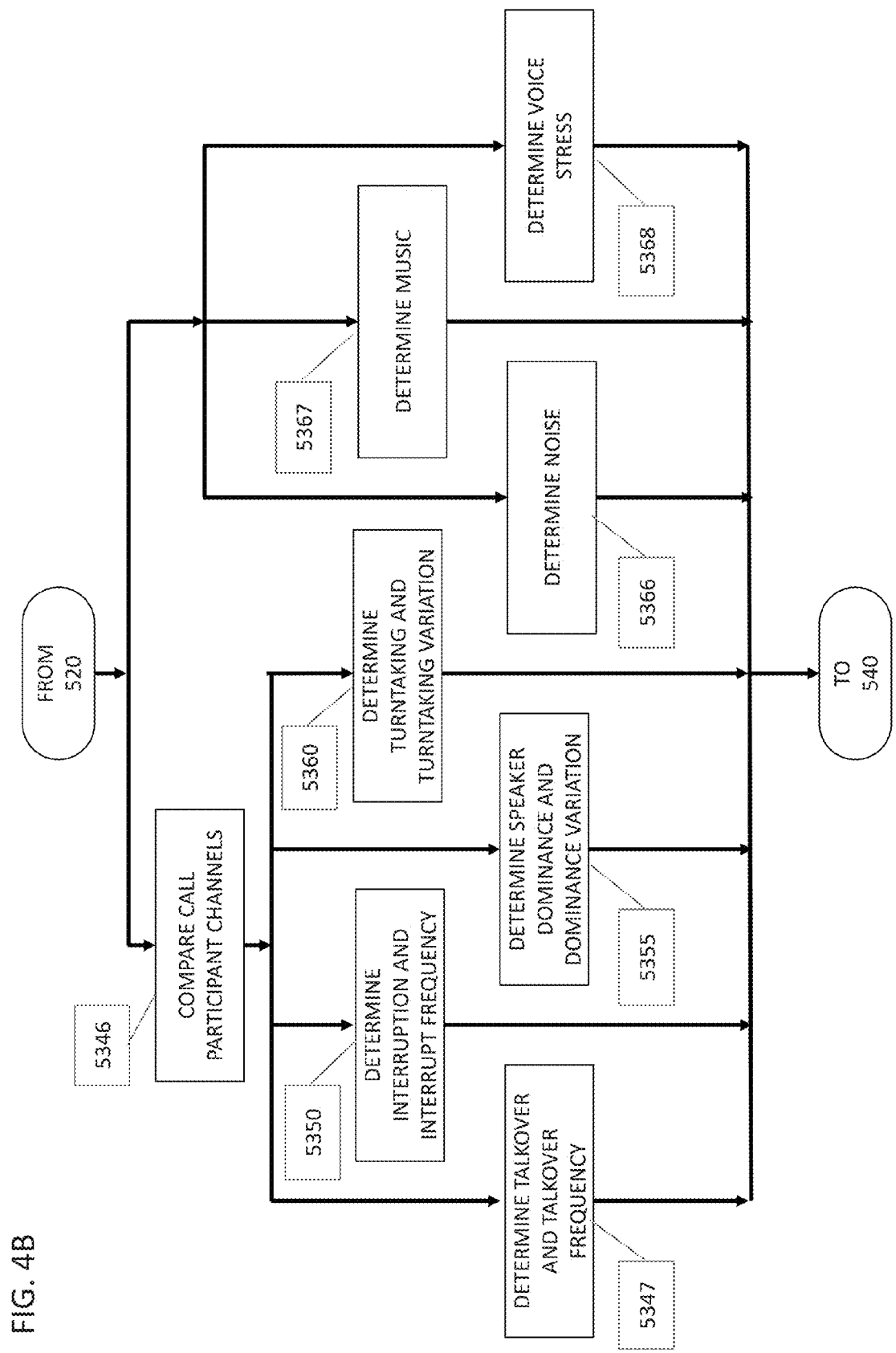
Figure 4C:
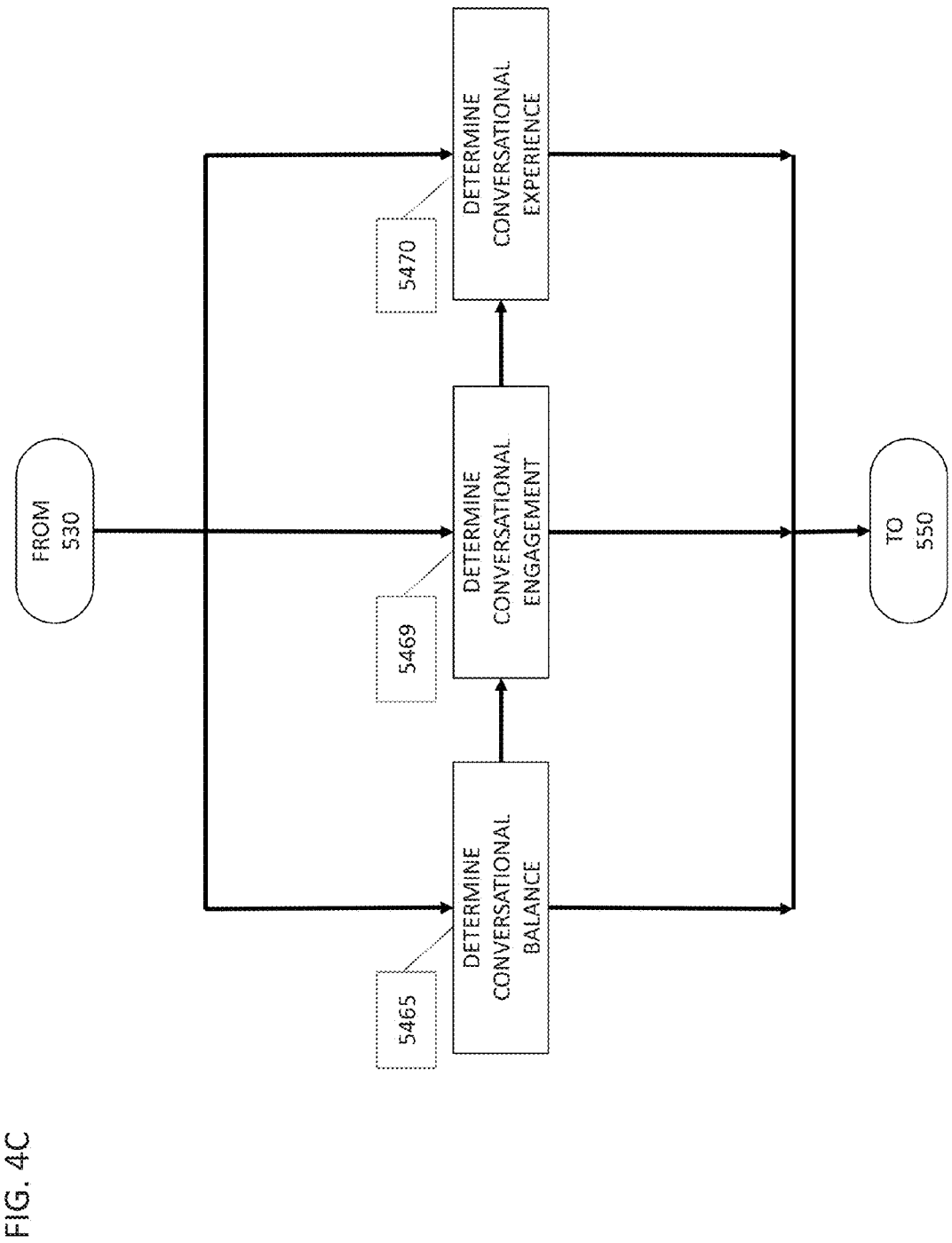

FIGS. 4A, 4B, and 4C show a flow chart illustrating an example of a process for analyzing the ongoing call signal 205 and generating the call analytics data in the method 500 (Step 520, 530, and 540 in FIG. 3), according to the principles of the disclosure.

Referring to FIGS. 2 and 4A-4C concurrently, the method may include one or more Steps 5215 to 5470 that may be carried out substantially simultaneously by one or more respective components 215 to 270. For instance, the ongoing call signal 205 may be received by the intensity determiner 215, which may analyze the signal and determine intensity values and intensity variation values (Step S215). Substantially simultaneously, the ongoing call signal 205 may be received by: the pitch determiner 220, which may analyze the signal 205 and determine pitch and pitch variation values (Step S220); the pitch confidence determiner 225, which may analyze the signal 205 and determine pitch confidence and pitch confidence variation values (Step S225); the intonation determiner 230, which may analyze the signal 205 and determine intonation and intonation variation values (Step S230); the articulation determiner 235, which may analyze the signal 205 and determine articulation and articulation variation values (Step S235); the tempo determiner 240, which may analyze the signal 205 and determine tempo and tempo variation values (Step S240); the accent determiner 245, which may analyze the signal 205 and determine accent and accent variation values (Step S245); a channel comparer 246, which may analyze the signal 205 and compare multiple call-participant call signals (channels) and generate a data stream that may be used with multi-channel determiners (Step S346); the talk-over determiner 247, which may analyze the signal 205 and determine the talk-over and talk-over variation values (Step S347); the interruption frequency determiner 250, which may analyze the signal 205 and determine interruption frequency and interruption frequency variation values (Step S350); the speaker dominance determiner 255, which may analyze the signal 205 and determine speaker dominance and speaker dominance variation values (Step S355); the turn-taking determiner 260, which may analyze the signal 205 and determine turn-taking and turn-taking variation values (Step S360); the conversational balance determiner 265, which may analyze the signal 205 and determine the conversational balance and conversational balance variation values (Step S465); the noise determiner 266, which may analyze the signal 205 and determine the noise and noise variation values (Step S366); the music determiner 267, which may analyze the signal 205 and determine music and music variation values (Step S367); the voice stress determiner 268, which may analyze the signal 205 and determine the voice stress and voice stress variation values (Step S368); and the conversational engagement determiner 269, which may analyze the signal 205 and determine the conversational engagement and conversational engagement variation values (Step S469); and the conversational experience determiner 270, which may analyze the signal 205 and determine the conversational experience and conversational experience variation values (Step S470).

Figure 5A:
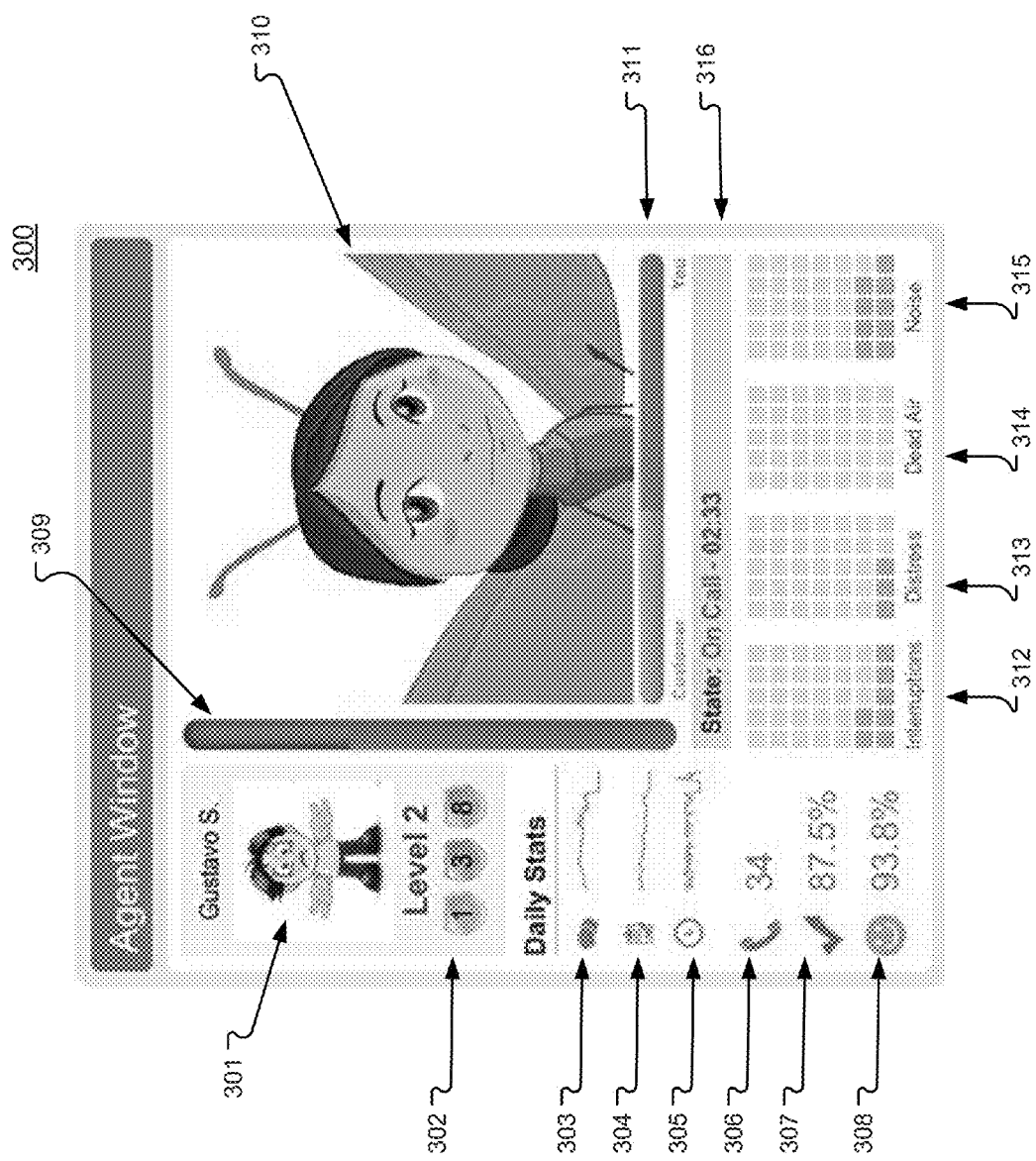
FIG. 5A shows an example of a graphical representation of a Human User Interface that is constructed in accordance with the principles of the disclosure.
Figure 5B:
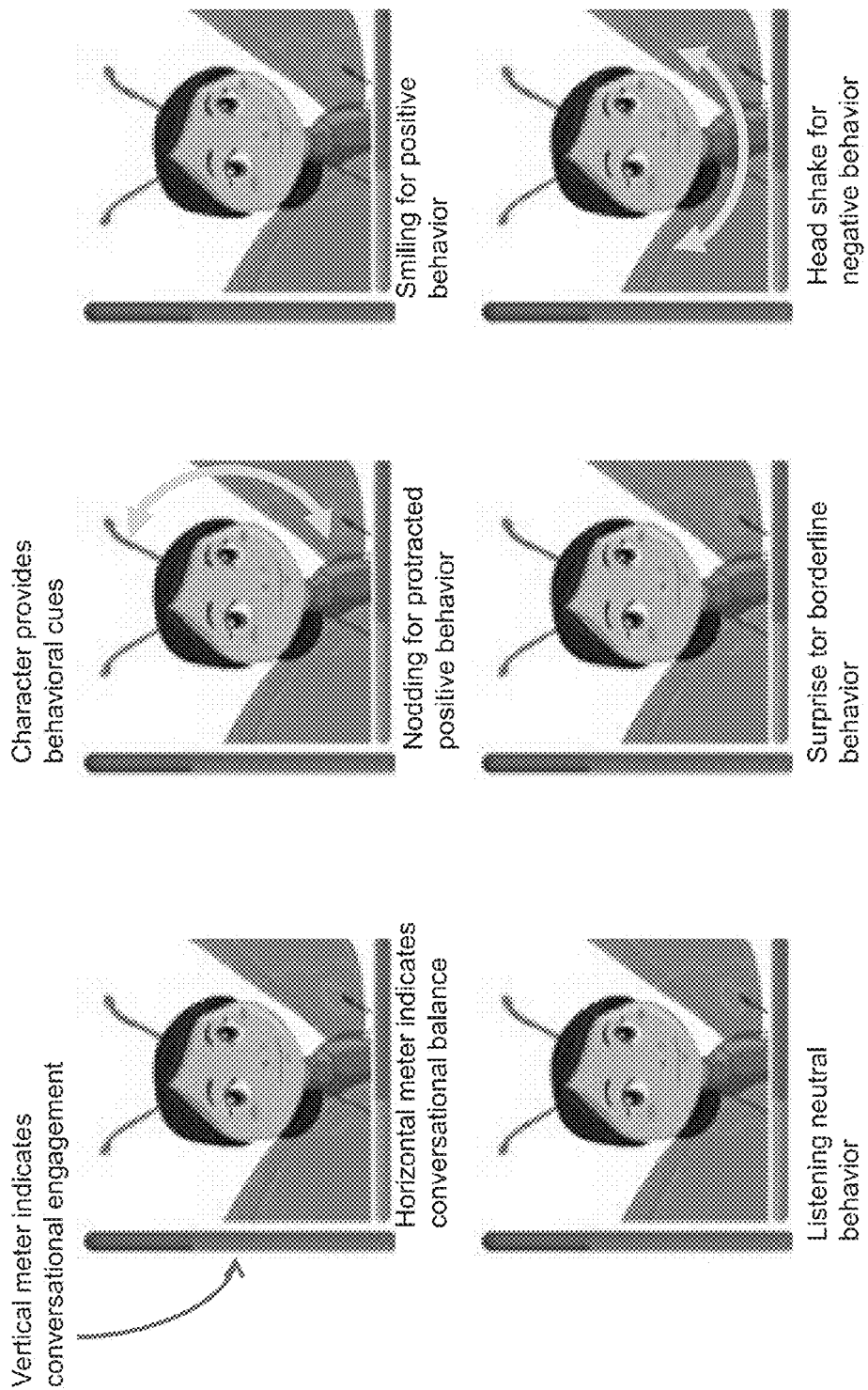
FIG. 5B shows various views of avatar behavior in the Human User Interface of FIG. 5A.

FIGS. 5A-5B show various views of an example of a HUI that may be provided on the communications device 10 to present the real-time call progress signal 285 to the call-participant (e.g., call center representative). The ongoing call signal 205 may also be provided simultaneously to the device 10. The real-time call progress signal 285, when reproduced on the device 10, may cause an agent window 300 to be manifested on a display of the communications device 10.

Referring to FIG. 5A, the agent window 300 may provide visual cues and behavioral reinforcement to a call-participant in real-time during an ongoing call. The agent window 300 may include a personal avatar 301, a recognition and status indicator 302, one or more performance indicators 303-305, one or more progress indicators 306-308, one or more alert status indicators 312-315, a current call status indicator 316, a conversational engagement monitor 309, a conversational balance monitor 311, and a companion avatar 310.

The personal avatar 301 may be personalized to an individual call-participant to increase a sense of ownership in the process. The personal avatar 301 may also give a sensory cue feedback signal, such as, e.g., a visual cue, an auditory cue, a haptic cue, an olfactory cue, or an environmental cue, to the call-participant based on the situation. The recognition and stats 302 may include the call-participant's accolades e.g., level, recognition, skill-set, awards, and the like. The performance indicators 303-305 may include daily statistics, such as, e.g., total time worked, task checklist, and the like. The progress indicators 306-308 may include current progress of an ongoing or completed call e.g., current call duration, number of calls or tasks completed, real-time feedback of an ongoing call, and the like.

The alert status indicators 312-315 may illustrate various indicators based on a current status of the ongoing call. The alert status indicators may include indicators, such as, e.g., an interruption status indicator 312, a distress status indicator 313, a dead air status indicator 314, and a noise status indicator 315. The conversational balance monitor 311 may illustrate factors, such as, e.g., speaking duration of either call-participant or the caller in comparison with a baseline set in the beginning of the call or a baseline based on previously inputted data. The conversational engagement monitor 309 may illustrate e.g., current engagement status between the caller and the call-participant. Lastly, the companion avatar 310 may illustrate an additional visual and behavior reinforcement cue using expression changes and gestures by the avatar that vary during the conversation based on the real-time call progress signal 285.

FIG. 5B shows various examples of avatar behavior that may be displayed on the HUI. The avatars may express a set of gestures (e.g., nodding, head shaking, smiling, frowning, and so on) based on the real-time call progress signal 285.

Figure 6:
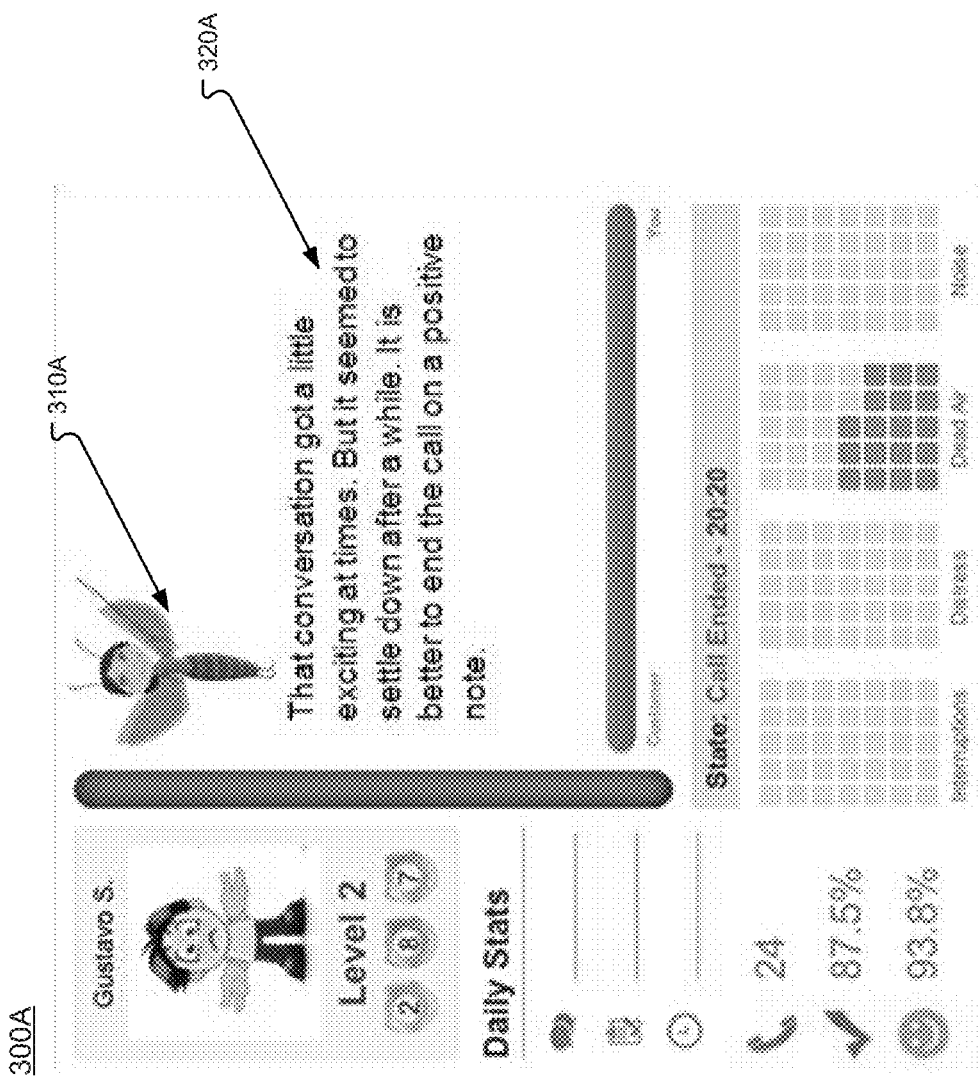
FIGS. 6-8 show various examples of a graphical representation of the Human User Interface that is constructed in accordance with the principles of the disclosure.
Figure 7:
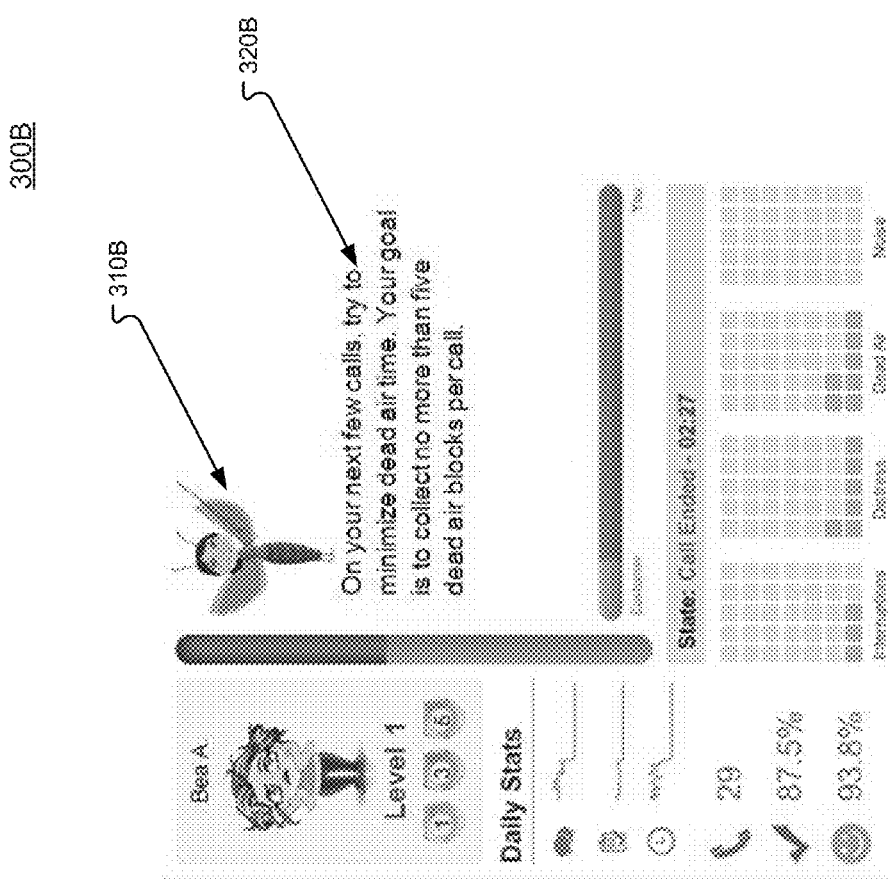
Figure 8:
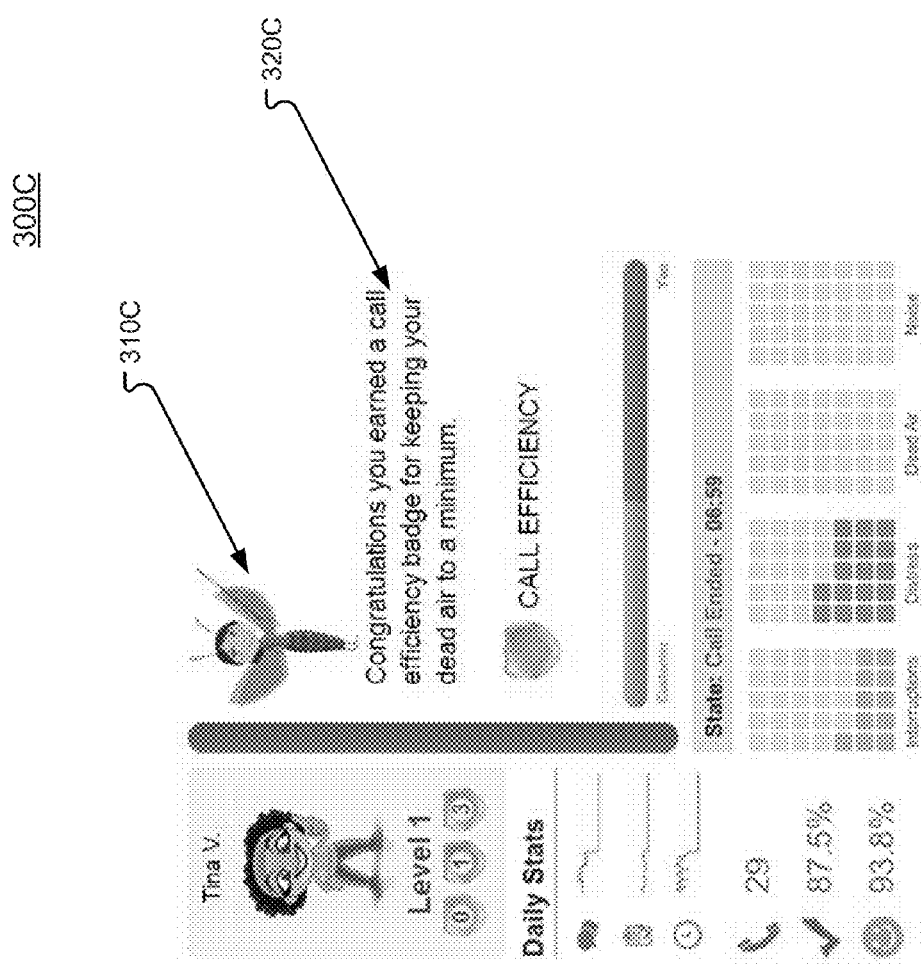
Figure 9A:
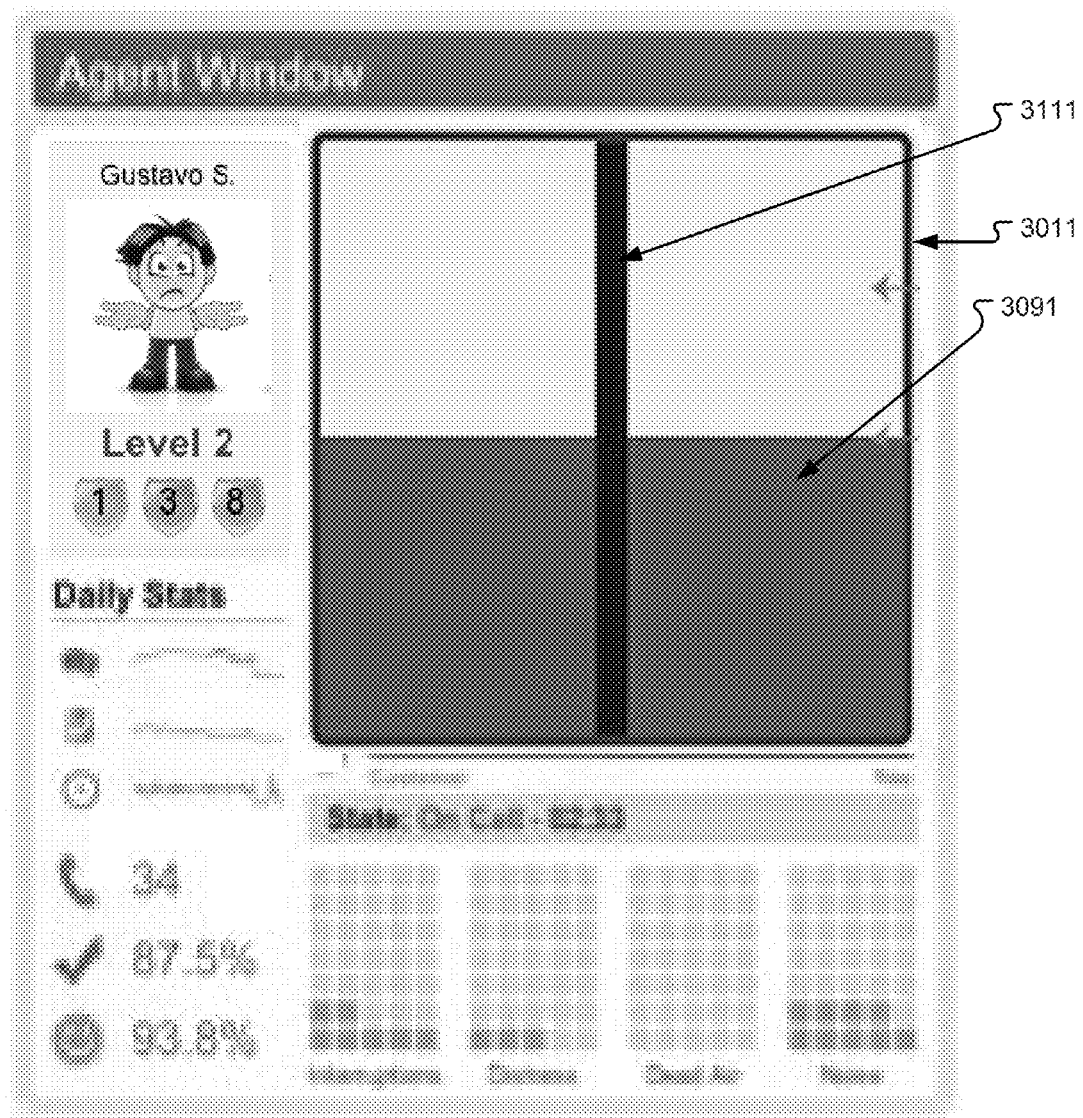
Figure 10A:
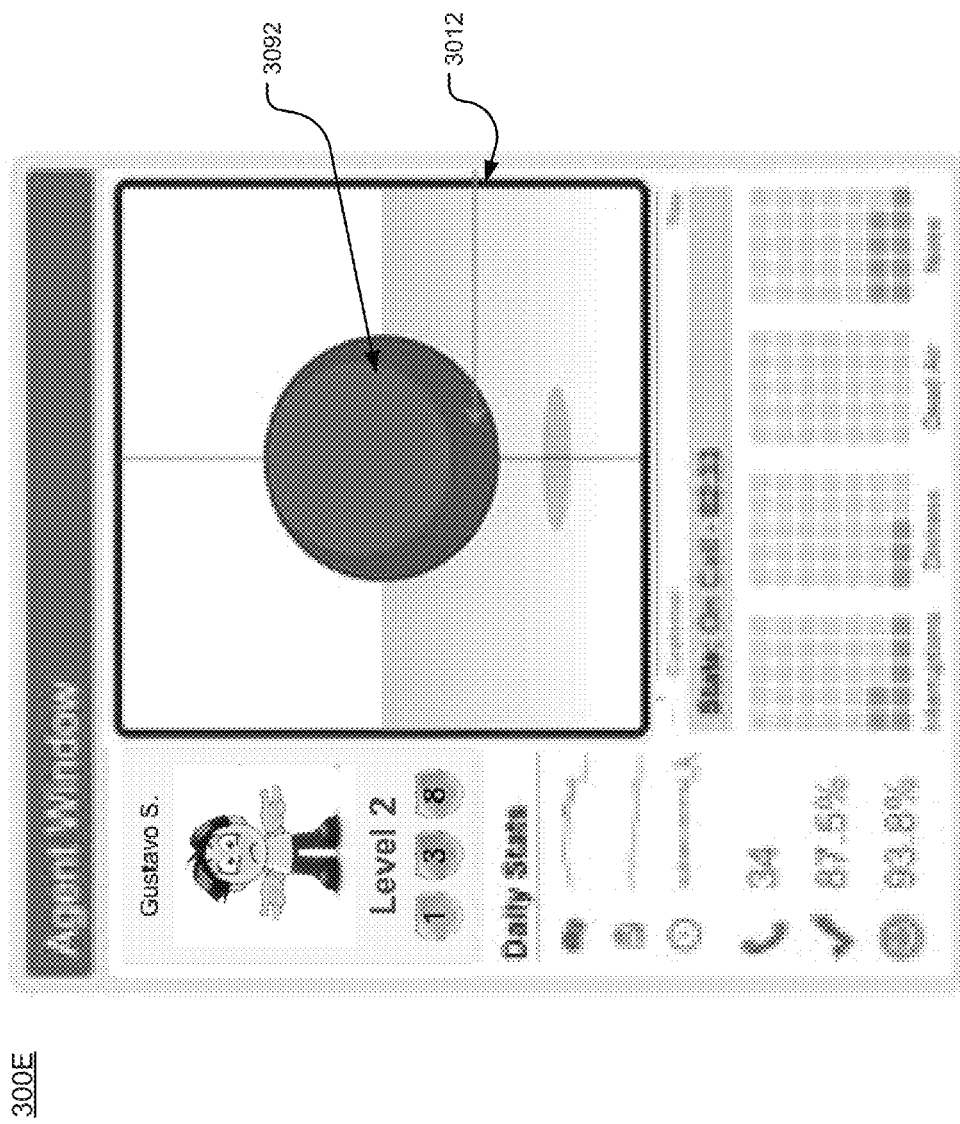
FIGS. 10A-10D show various views of yet another example of a graphical representation of the Human User Interface that is constructed in accordance with the principles of the disclosure.
Figures 10B, 10C, 10D:
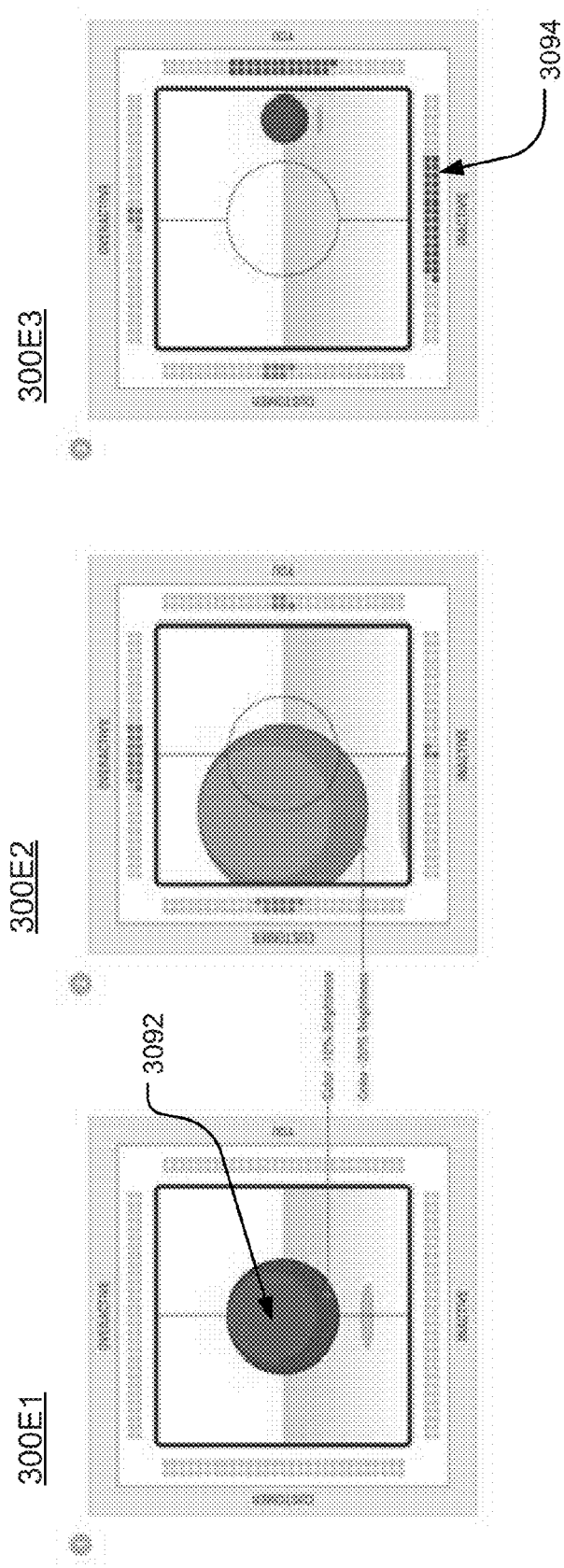

FIGS. 6, 7, and 8 illustrate examples of the HUI displaying agent windows 300A, 300B, and 300C, respectively, after the call is over. After the call, narrative evaluations 320A, 320B, and 320C of the call-participant's performance may be displayed on the agent windows 300A, 300B, and 300C, respectively. The narrative evaluations may be stored in database 60 (shown in FIG. 1), storage 265 (shown in FIG. 2), or both.

As seen in FIG. 6, the companion avatar 310A can still be present but it may be resized to fit the narrative evaluation 320A in the agent window 300A. The narrative evaluations 320A, 320B, and 320C may be individualized and differ based on the call-participant's performance, as seen in FIGS. 6-8, respectively. The narrative evaluations 320 may be used to shape perceptions of the on-call experience and also motivate ongoing skills development by recognizing accomplishment and presenting challenges to develop new skills. The narrative evaluations 320 may also contain instructional elements to help facilitate discovery-based learning and the development of new soft-skills.

FIGS. 9A-9D show various views of another example of a HUI that may be provided on the computer 10. As seen in FIGS. 9A-9D, a visual cue 3011 may be displayed, which is different from the avatar cue 309 (e.g., shown in FIG. 5A). As seen in these figures, the HUI may provide an agent window 300D with a visual cue that may provide for a more compact view (e.g., less desktop space) since the cue would not display gestures or expressions that may be expressed by an avatar.

Referring to FIGS. 9A-9D, a vertical (or horizontal) line 3111 that is configured to move along the horizontal (or vertical) axis may indicate conversational balance between the call-participants, such as, e.g., speaking duration of either call-participant or the caller in comparison with a baseline set in the beginning of the call or a baseline based on previously inputted data. The line 3111 may move from left to right based on the conversational balance. For instance, the line 311 may move from right to left if the conversation is dominated by the customer and right to left if it is dominated by the front-line employee. The vertical (or horizontal) fill 3091 may indicate conversational engagement which may illustrate e.g., current engagement status between the call-participants. The fill 3091 may move up and down (or horizontally) based on conversational engagement e.g., up if the conversational engagement is overactive and down if it is inactive. The fill 3091 may include any color, pattern, or shape, as will be understood by those skilled in the art. For instance, the fill 3091 may include one or more of various colors that indicate conversational experience, for example, green may indicate a good experience and red may indicate an experience at risk. In addition, event indicator 3102 (shown in FIG. 9D) may be displayed in the frame to indicate ongoing events.

FIGS. 10A-10D show various views of yet another example of a HUI that may be provided on the computer 10. As seen in FIGS. 10A-10D, a visual cue 3012 may be displayed, which is different from the avatar cue 309 (e.g., shown in FIG. 5A) or the visual cue 3011 (e.g., shown in FIG. 9A). As seen in these figures, the HUI may provide an agent window 300E with a visual cue that may also provide for a more compact view (e.g., less desktop space) since the cue would not display gestures or expressions that may be expressed by an avatar.

Referring to FIGS. 10A-10D, an object (e.g., a circle) 3092 may indicate conversational balance and engagement. The size of the object 3092 may indicate conversational engagement, which may illustrate e.g., current engagement status between the caller and the call-participant.

The size of the object 3092 may grow or decrease based on the conversational engagement. For instance, the size of the object 3092 may grow in size if the conversational engagement is high. On the other hand, the size of the object 3092 may shrink in size if the conversational engagement is low.

The horizontal position of the object 3092 may indicate conversational balance. For example, horizontal position may vary based on speaking duration of either call-participant, the caller in comparison with a baseline set in the beginning of the call, or a baseline based on previously inputted data. The object 3092 may move from right to the left if the conversation is dominated by the customer and right to left if it is dominated by the call-participant.

The object 3092 may include one or more of a variety of colors to indicate conversational experience. For example, the object 3092 may include a green color to indicate a good experience and red may indicate an experience at risk. In addition, event indicator 3094 (shown in FIG. 10D) may be displayed in the frame to indicate ongoing events.

Figure 11:
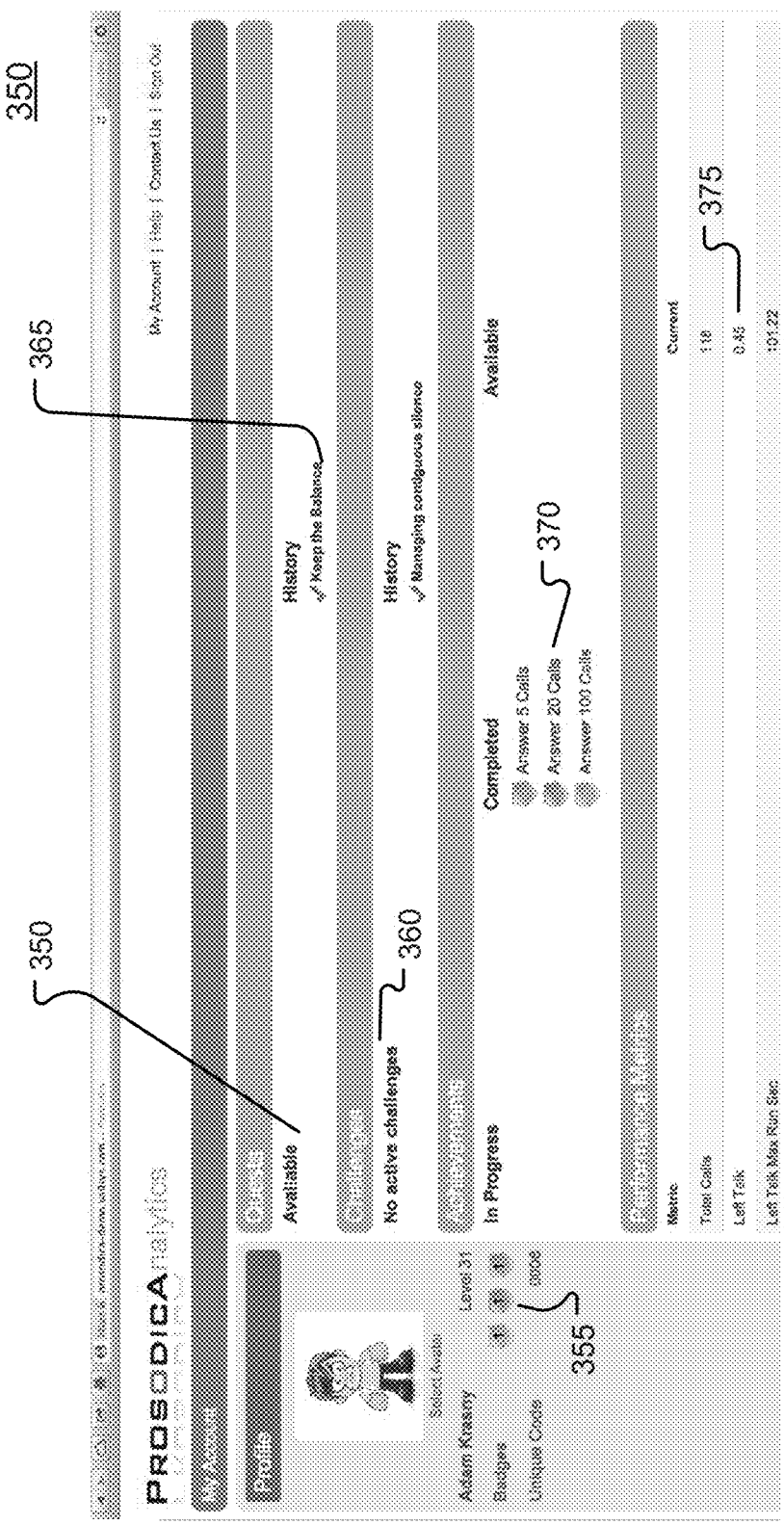
FIG. 11 shows a further example of a graphical representation of the Human User Interface that is constructed in accordance with the principles of this disclosure.

FIG. 11 shows an example of a call-participant profile with, e.g., achievements, that may be displayed on the computer 10. As seen in FIG. 11, badges 355 and achievements tab 375 may acknowledge achievement and/or mastery of work related behaviors. The call-participant may be further challenged with in-progress challenges and quests as displayed in challenges tab 360. Currently available challenges and quests may be displayed in quests tab 350. The completed challenge and quests may be displayed in history tab 365. Lastly, the performance history may be displayed in performance tab 375.

Figure 12:
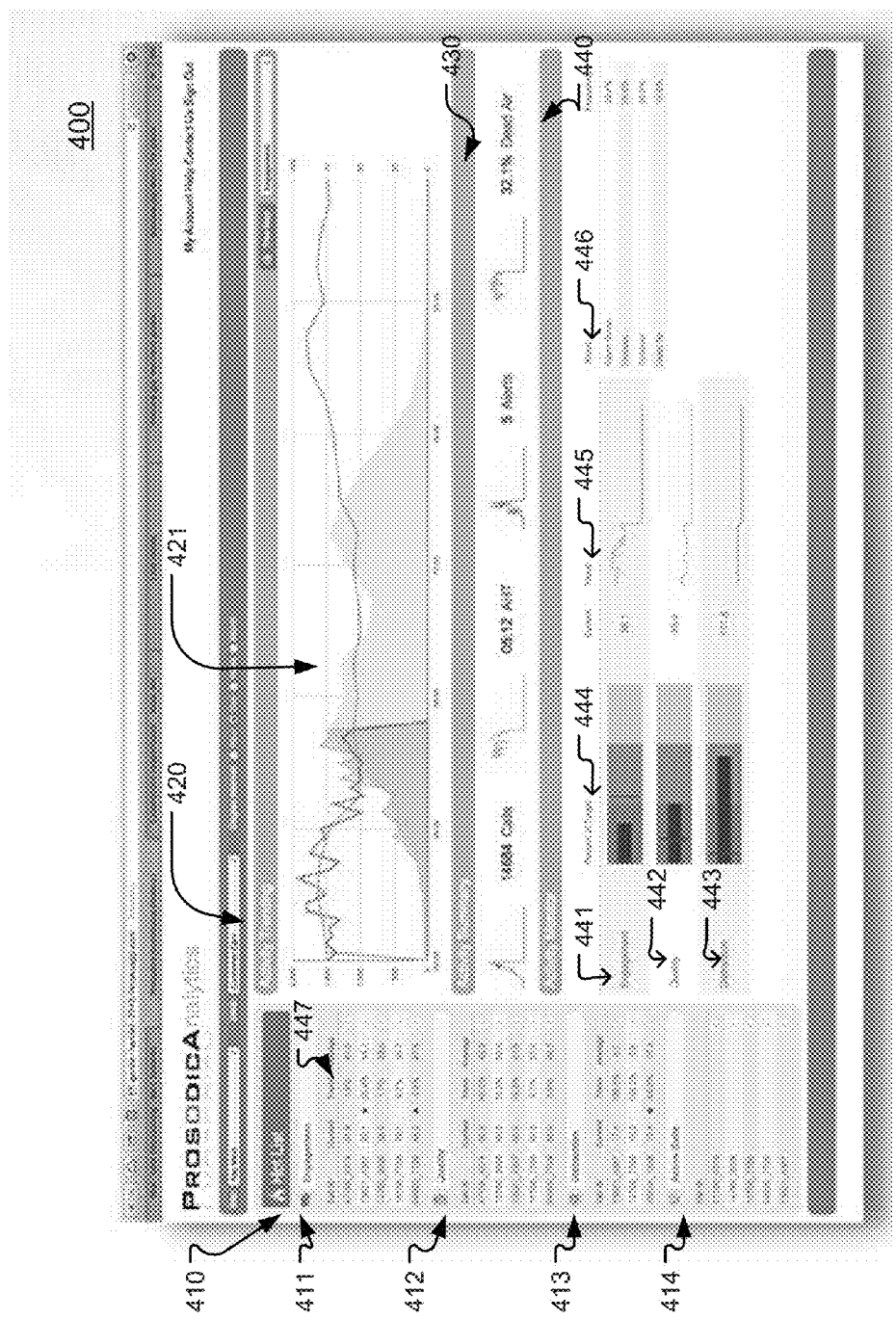
FIG. 12 shows an example of a graphical representation of a Supervisor User Interface that is constructed in accordance with the principles of the disclosure.
Figure 14:
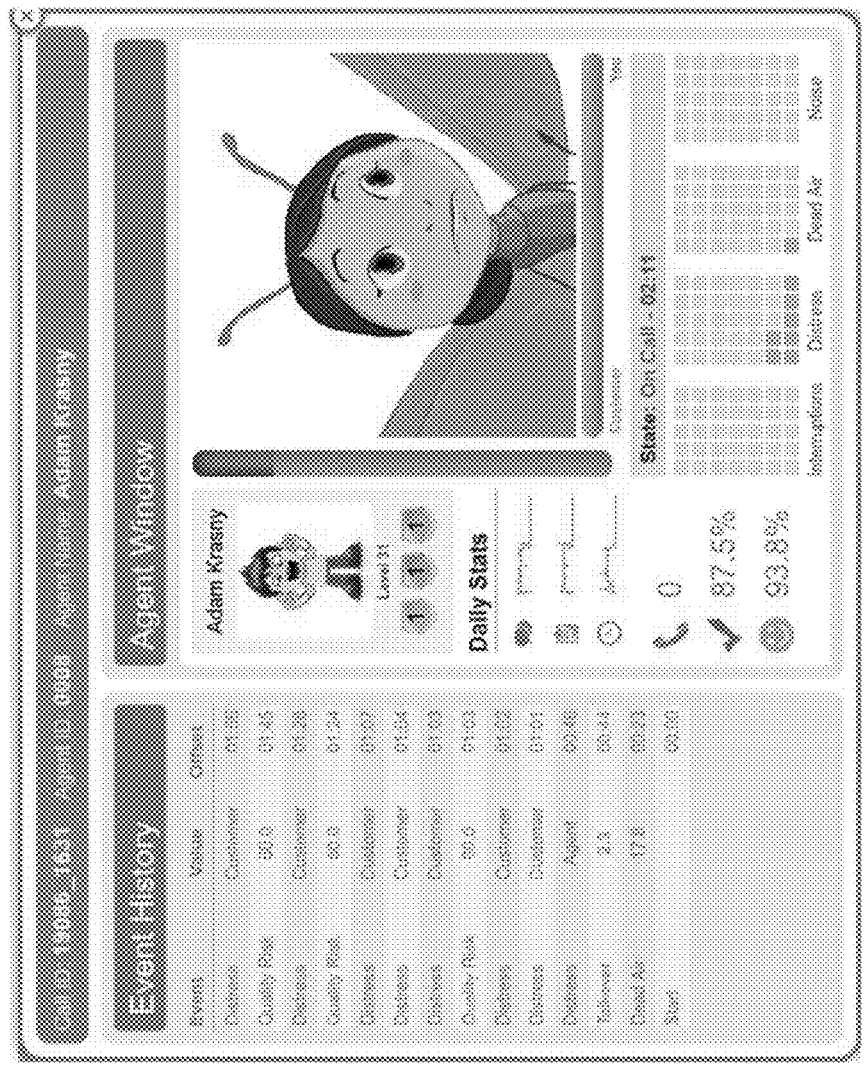
FIG. 14 shows an example of a graphical representation of a call detail for Supervisor User Interface that is constructed in accordance with the principles of the disclosure.

FIG. 12 illustrates an example of a Supervisor User Interface (SUI) 400 that may be graphically displayed. The SUI 400 may provide a monitor with a real-time graphic display to allow for monitoring of on-call activity. The SUI 400 may provide a monitor with a real-time graphic display similar to that of the HUI to allow for monitoring of on-call activity. As seen in FIG. 14, the SUI 400 may also display event history to allow a monitor to view the progression of events that have transpired for a conversation prior to the point the monitor focuses on the call. This facilitates a scenario where the monitor is directed to a call based on an alert event, which allows the monitor to focus their attention on unusual conversational patterns that led to that event such that they can provide an appropriate action.

Figure 13:
FIG. 13 shows an example of a graphical representation of an alert message that is constructed in accordance with the principles of the disclosure.

FIG. 13 shows an example of an alert message that may be sent to and displayed (e.g., as a pop-up message) on the monitor's display when the alert event is determined. The SUI 400, shown in FIG. 14, may be displayed on the monitor's screen in response to selection of the "View Call" radio button by the monitor.

The SUI 400 may include a hot list 410 that may direct the monitor's attention to conversations that may be of interest based on specific factors of the interaction, such as, e.g., an engagement factor 411, a quality of experience factor 412, a distraction factor 413, and an active calls factor 414. The hot list 410 may utilize other factors as well including conversational balance, or voice stress. These factors are based on a real-time call progress signal 285 and they may be shown in real-time and/or post-call. The factors 411-414 may be collapsible/expandable so as to minimize/maximize their display on the SUI. The factors 411-413 may include data, such as, e.g., caller ID, current value, trend value, and average value. The factor 414 may include, e.g., the caller IDs of active calls.

The SUI 400 may further include an activity monitor 440, which may include a plurality of fields, such as, e.g., a percent of target field 444, a trend field 445, and an event field 446. The percent of target field 444 may illustrate the current status of the engagement factor 441, quality of experience factor 442, and distraction factor 443 with respect to predetermined target values. In category 447, the monitor's attention may be directed to the most "interesting" conversations based on specific dimensions of the interaction. The percent of target field 44 may be helpful to the monitor in measuring the performance of the call-participant. For example, the fields 441, 442, and 443 may be shown in a graphical form (e.g., charts, bars, or the like) so that the performance can be monitored verses organizational goals or a predetermined baseline. Additionally, the performance may also be trended to provide additional analysis to the monitor, as shown, e.g., by the trend field 445. The message occurrence frequency may also be monitored as shown in the events field 446.

The SUI 400 may also include an activity field 430, which may include for a predetermined period, e.g., the number of calls, the average handle time (AHT), the number of alerts, the percentage of dead air, and the like. The statistics associated with a given call-participant may be compared to an overall historical trend in an activity trending field 420, as seen in FIG. 12. In addition, SUI 400 may incorporate the display of data from external sources such as existing CRM systems in order to provide a consolidated dashboard of key performance metrics as required to support operational visibility. These data may be incorporated into the system database in order to provide historical or trended information as with other displayed fields.

Figure 15:
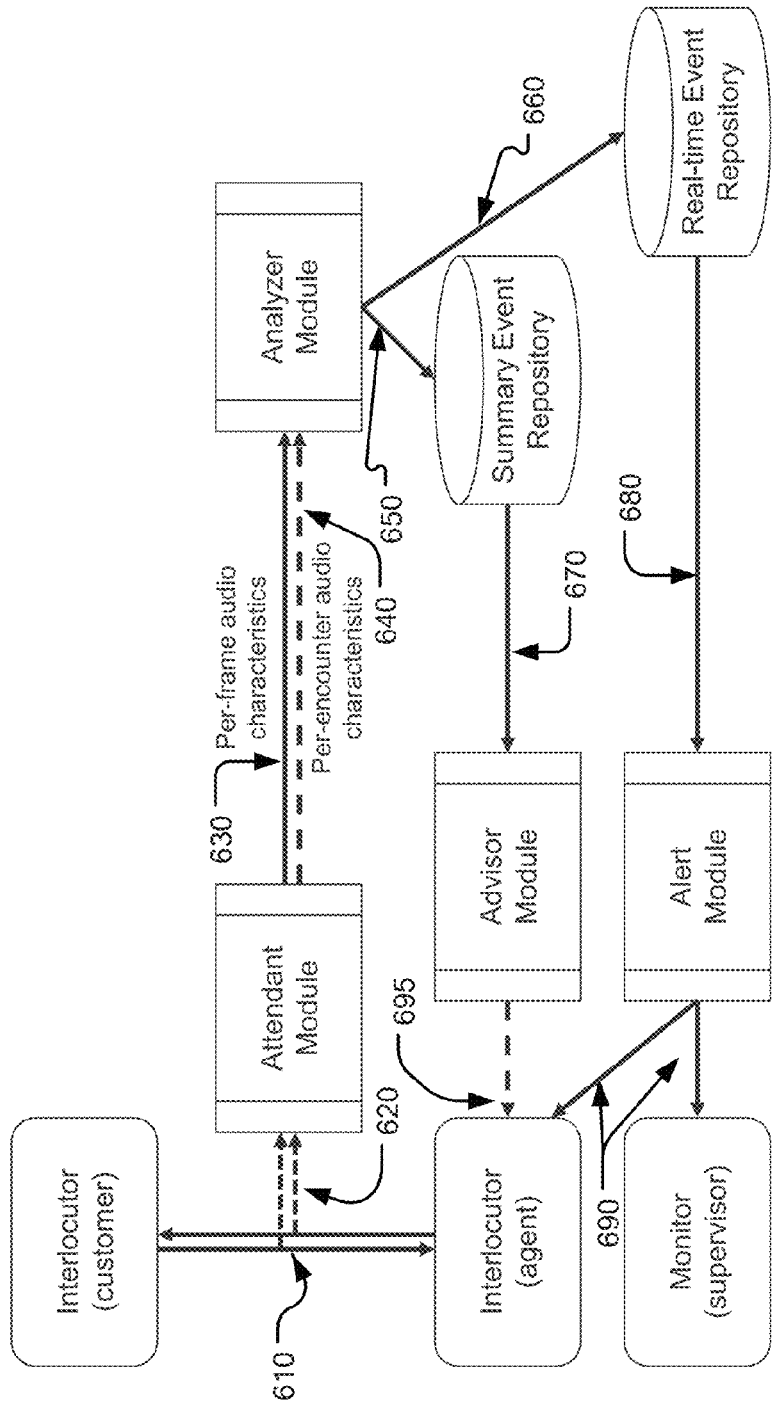
FIG. 15 shows yet another example of a system that measures and influences a person's behavior in accordance with the principles of the disclosure.

FIG. 15 shows another example of a system 600 (and method for operating the same) that is constructed according to the principles of the disclosure. The system 600 is configured to measure and improve call-participant behavior in real-time. The system 600 may include an attendant module, an advisor module, an alert module, and an analyzer module. Referring to FIG. 2, the attendant module, advisor module and alert module may be provided in the reporter 275. The analyzer module may include, e.g., one or more of the intensity determiner 215, pitch determiner 225, intonation determiner 230, articulation determiner 235, tempo determiner 240, accent determiner 245, channel comparer 246, talk over determiner 247, interruption frequency determiner 250, speaker dominance determiner 255, turn-taking determiner 260, conversational balance determiner 265, noise determiner 266, music determiner 267, voice stress determiner 268, conversational engagement determiner 269, and/or conversational experience determiner 270 (shown in FIG. 2), discussed above. The system 600 may further include a summary event repository and a real-time event repository. The summary event repository and/or real-time event repository may be provided, e.g., in the storage 271 (shown in FIG. 2), the database 60 (shown in FIG. 1) and/or the server 50 (shown in FIG. 1).

As seen in FIG. 15, an interlocutor (e.g., customer) may initiate an interaction with another interlocutor (e.g., call-participant, which may be a front-line employee) via a calling system, such as, e.g., a telephone system, a live messaging system, a video chat system, an Internet Voice-over-IP (VoIP) call system, and so on (Step 610). In the system 600, the ongoing call signal from the interlocutors (e.g., caller and call-participant) may be received by the attendant module (Step 620). The attendant module may be provided in, e.g., the call-participant communication device 10 (shown in FIG. 1) or the reporter 275 (shown in FIG. 2). The attendant module may generate and provide audio data frames to the analyzer module for further analysis (Step 630). The audio data frames may include per-frame audio characteristics for the ongoing call between the interlocutors. The audio data frames may further include per-encounter audio characteristics for the particular call-participant.

The analyzer module provides analysis of the interaction between the customer and the call-participant. Based on per-frame audio characteristics, the analyzer generates a real-time event which is written to the real-time event repository (Step 660). The per-encounter audio characteristics are analyzed to generate a set of events, which are written to the summary event repository (step 650). These analyzer modules may implement, e.g., auto-optimization, natural language analysis, machine learning, and the like.

The advisor module polls the summary event repository (Step 670) and translates events from the ongoing call into feedback, such as, e.g., post-call advice, instruction, recommendations, and challenges to the call-participant. This feedback may be conveyed through a narrative evaluation of the encounter and may include, instructional content and/or recommendations for behavioral changes in future encounters (Step 695). The feedback may include sensory (e.g., visual, sound, olfactory, taste, touch, and the like) cue signals to influence the call-participant's behavior through, e.g., gameplay.

The alert module polls the real-time event repository (Step 680) and translates events from the call into real-time feedback to the call-participant, the monitor or another system component that can take an action (Step 690). Similar to a feedback from the advisor module, the real-time feedback may include sensory cue signals.

Figure 16:
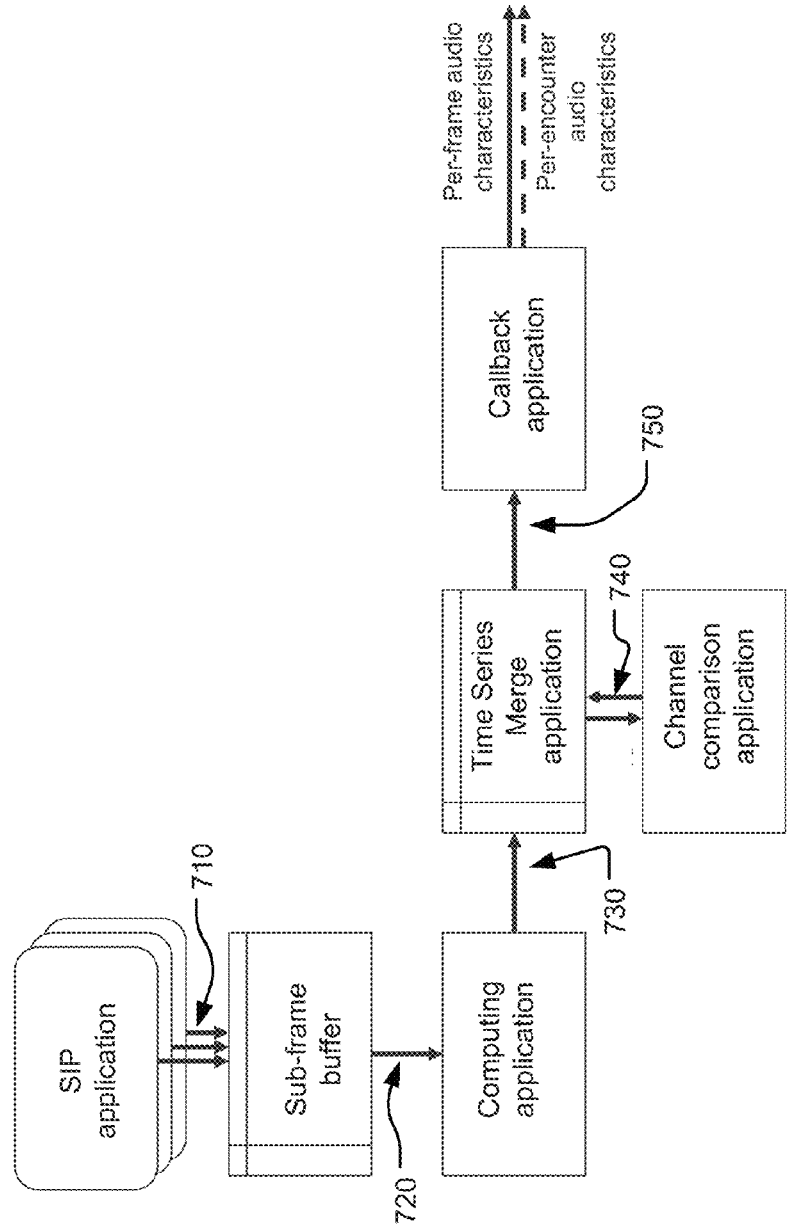
FIG. 16 shows an example of an attendant module that is constructed in accordance with the principles of the disclosure.

FIG. 16 illustrates an example of the attendant module that is constructed according to the principles of this disclosure. The attendant module may include a session initiation protocol (SIP) application, sub-frame buffer, a computing application, a time series merge application, a channel comparison application, and a callback application. The SIP application may intercept and process sample data in the ongoing call signal (e.g., unstructured waveforms in multi-channels) by applying digital signal processing (DSP) to each SIP stream per channel. The SIP processed data 710 may be forwarded to the sub-frame buffer. The sub-frame buffer stores the processed sample data 710 from SIP DSP and sends the buffered processed data 720 to a computing application. The computing application determines per-frame values 730 that depend on that per-channel's sample data, such as, e.g., an intonation variance signal, an articulation variance signal, a tempo variance signal, an accent variance signal, an amplitude variance signal, a pitch variance signal, a turn-taking variance signal, a speaker dominance frequency, an interruption frequency, and the like. The time series merge application takes the results 730 from the computing application and inserts the results into time series merge row that corresponds to the sample buffer timestamp. The channel comparison application compares and computes frame values 740 that depend on other frame values, such as, e.g., intensity, pitch, intonation, tempo, time series merge history, and the like. The callback application accesses time series merge rows and their history 750 in order to generate per-frame audio characteristics and per-encounter audio characteristics.

Figure 17:
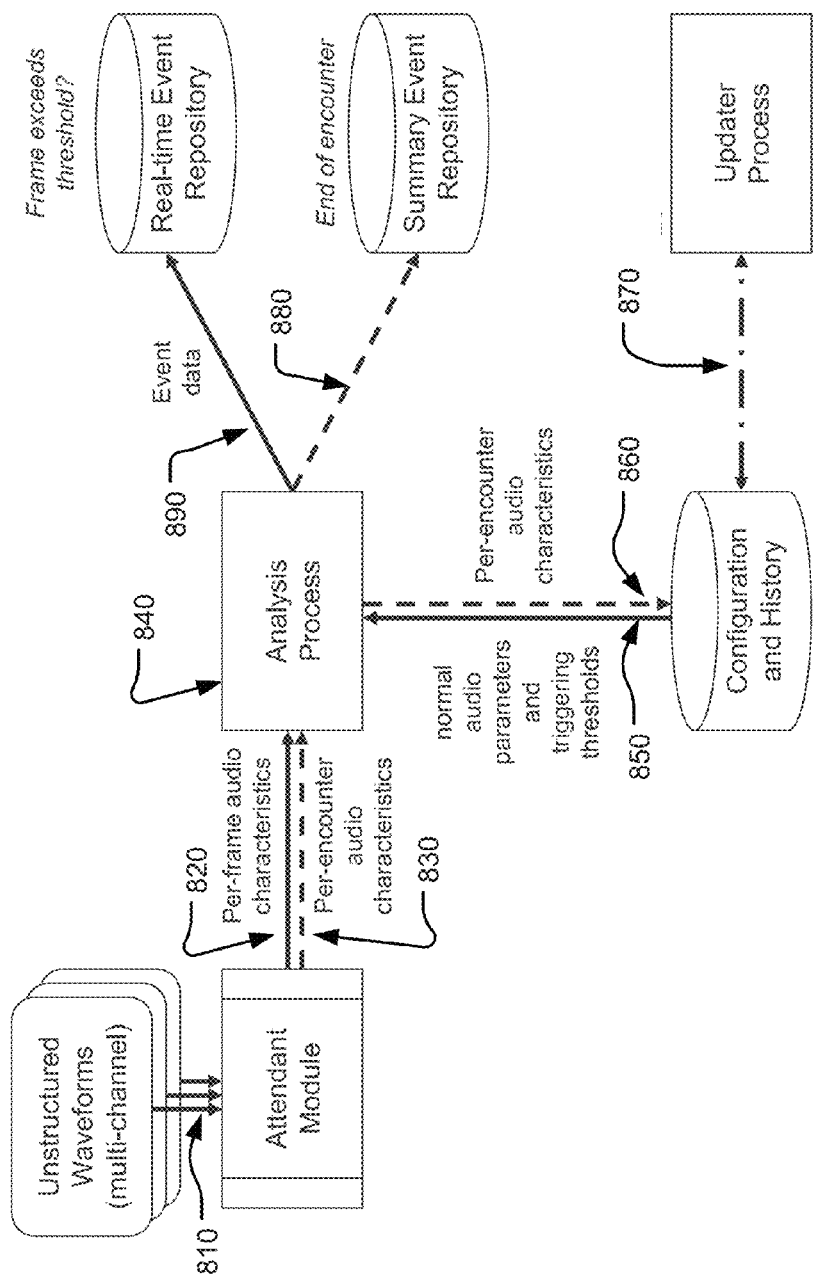
FIG. 17 shows an example of an analyzer module that is constructed according to the principle of the principles of the disclosure.

FIG. 17 shows an example of a flow diagram 800 for the analyzer module operating in, e.g., the system 600 (shown in FIG. 15). The analyzer module may include an analysis processor that carries out an analysis process as described herein. At the start of a new encounter (e.g., a telephone call, a video conference, an Internet call, and so on) between a customer and a call-participant, the attendant module may begin monitoring the interaction, receiving unstructured waveforms 810 from one or more channels. The attendant module may stream data for each evaluated frame 810 of the encounter (e.g., per-frame audio characteristics) until the end of the interaction using an analytical technique, such as, e.g., LDC, k-NN, GMM, SVM, Decision tree algorithms, HMM's, auto-optimizing algorithms, natural language analysis algorithm, machine learning algorithms, and or the like. At the end of the interaction, the attendant module may produce a set of summary statistics frames 820, 830 (e.g., per-frame audio characteristics, per-encounter audio characteristics) that signify the end of the encounter at which point, the attendant module may terminate. Both the summary statistics frame and evaluated frame records may be sent to the analysis processor for secondary analysis.

During the secondary analysis, the analysis processor may retrieve the most current version of the "normal" audio parameters (e.g., a baseline, an exemplary sample, a target sample, or the like) and pre-determined event thresholds 850 from the configuration and history repository. The "normal" audio parameters can be established based on the system "learning" from aggregated sample of audio. That sample may represent typical conversations in general, or conversations of a given type (sales, service, technical support, and the like) or even conversations with a specific participant (caller or call taker).

The analysis processor may also store per-encounter audio characteristics 860 in the configuration and history repository. On a periodic basis (e.g., every day, hour, minute, second, or the like), an update process application in the analyzer module may consume the summary statistics frame 870 within the configuration and history repository and use the data to update the "normal" audio parameters and pre-determined event thresholds.

As the analysis processor gets prepared to terminate and/or after the termination of the call interaction, the analysis processor may write the summary statistics and log of all of the events it generated 880 into the summary event repository. If a frame record from the attendant module contains an event that exceeds a pre-determined threshold, the analysis processor may write the event data 890 in a record to the real-time event repository.

Figure 18:
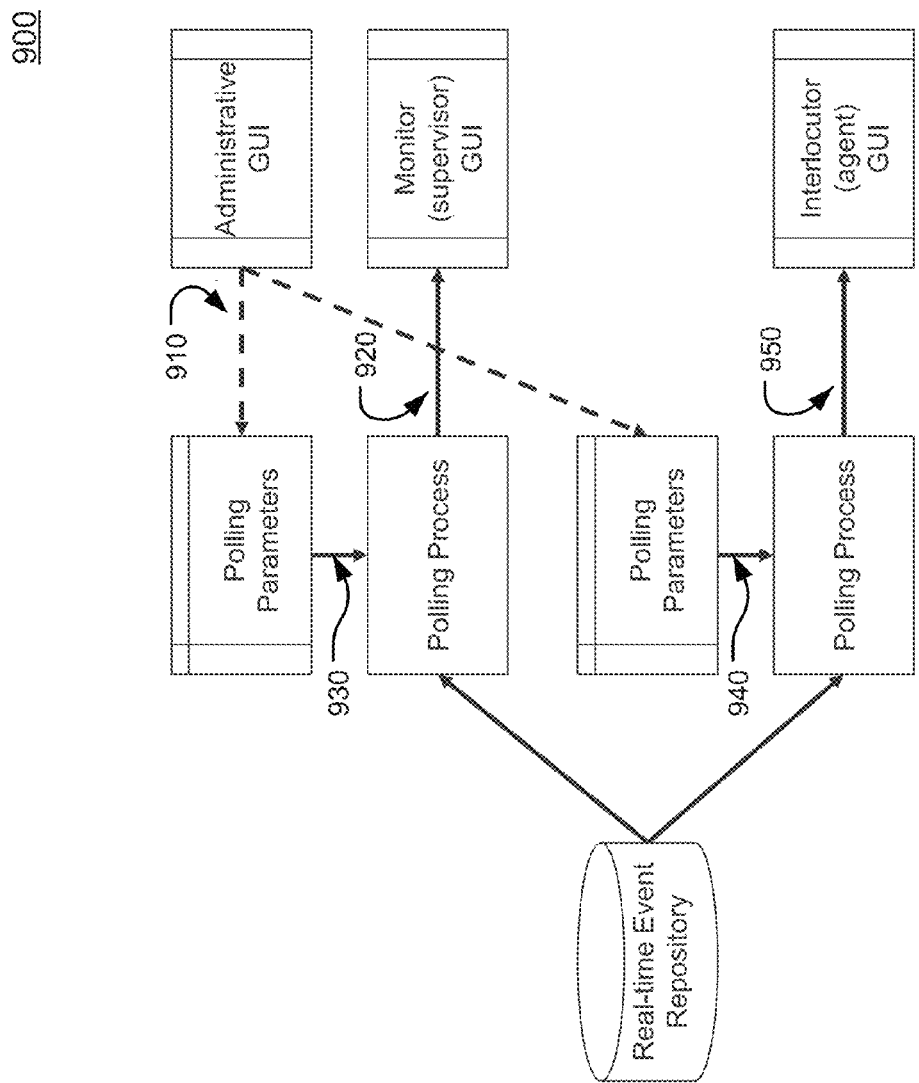
FIG. 18 shows an example of an alert module that is constructed according to the principles of the disclosure.

FIG. 18 shows an example of a flow diagram 900 for the alert module that may be included in the system 600 (shown in FIG. 15). The alert module may include an administrative graphic user interface (GUI), a monitor GUI, an interlocutor GUI, and a polling processor. The administrative GUI may be used to establish a set of parameters 910 that determine what kind of real-time events (e.g., a sudden change in caller's voice pitch, amplitude, pitch confidence, intonation, protracted change in the balance, engagement or conversational experience, and so on) should be exposed to the monitor and the call-participant. The polling parameters 930 may be received by the polling processor, which may be configured to receive events from the real-time event repository on a periodic basis so that the monitor can look for and access events 920. On the basis of the presence of certain real-time events, the polling processor may generate a message and initiate a callback 920 to the monitor GUI.

The alert module may include a second polling processor, which may be configured for the call-participant to look for events in the real-time event repository and, based on presence of certain real-time events, generate a message and initiate a callback 950 to the call-participant. The second polling processor may receive the polling parameters 940, which may be established by the administrative GUI. The parameters 940 may be the same as, or different from parameters 930. The parameters 940 may include, e.g., a sudden change in caller's voice pitch, amplitude, pitch confidence, intonation, protracted change in the balance, engagement or conversational experience and the like.

The first and second polling processors may be formed as a single processor that is configured to carry out the separate polling processes shown in FIG. 18.

The interlocutor GUI conveys a real-time message to the call-participant in an appropriate format based on the priority of the message (e.g., whisper/loud noise for higher priority, text for high priority, avatar gesture or expression for low priority, and so on). FIG. 13 shows an example of a text-based alert that may be displayed to GUI and SUI 400.

Figure 19:
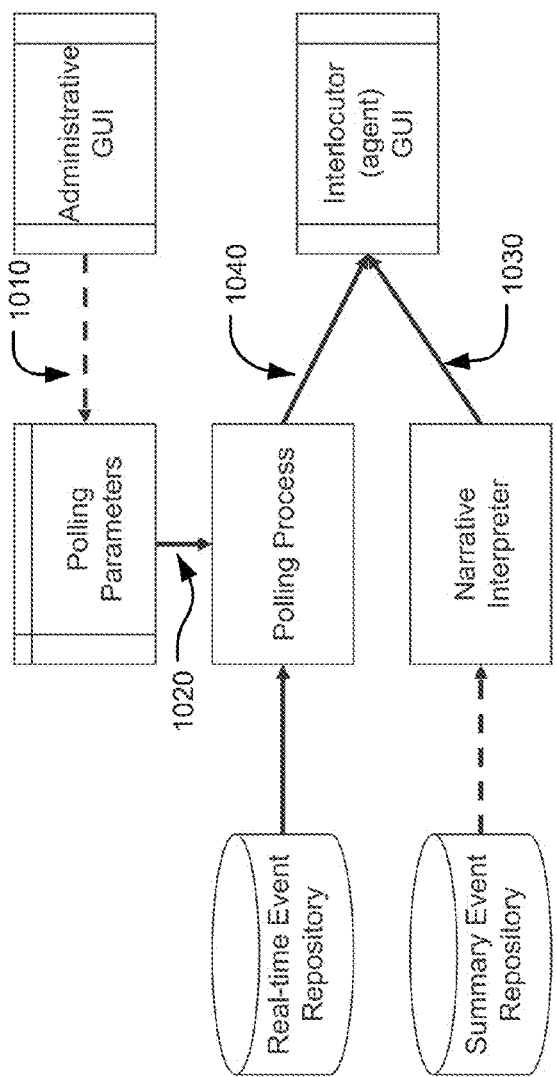
FIG. 19 shows an example of an advisor module that is constructed according to the principles of the disclosure.

FIG. 19 illustrates an example of a flow diagram 1000 for the advisor module in system 600 (shown in FIG. 15). The advisor module may comprise an administrative GUI, an interlocutor GUI, a polling processor and a narrative interpreter. The administrative GUI may be used to establish a set of polling parameters 1010 that determine what kind of real-time events (e.g., a sudden change in caller's voice pitch, amplitude, pitch confidence, intonation, and so on) should be exposed to the interlocutor. The polling parameters 1020 may be received by the polling processor. The polling processor, e.g., on a periodic basis, may look for certain events in the real-time event repository and, based on presence of certain real-time events, generate a message and initiate a callback 1040 to the interlocutor GUI. The interlocutor GUI may be configured to convey a real-time message to the call-participant in an appropriate format based on the priority of the message (e.g., whisper/loud noise for higher priority, text for high priority, avatar gesture or expression for low priority, and the like) and also convey a post-call message to the call-participant.

The narrative interpreter is configured to poll the summary event repository for all events logged for the call and then translate the events into a post-call narrative and initiate a callback 1030 to the interlocutor GUI, where the narrative interpreter provides multiple narrative elements (e.g., two, three, or more), an observation, and a diagnosis and a recommendation for future performance (or an elicitation for self-expression), and in some instances, present instructional content or format a challenge or achievement in lieu of a post call narrative.

Figure 20:
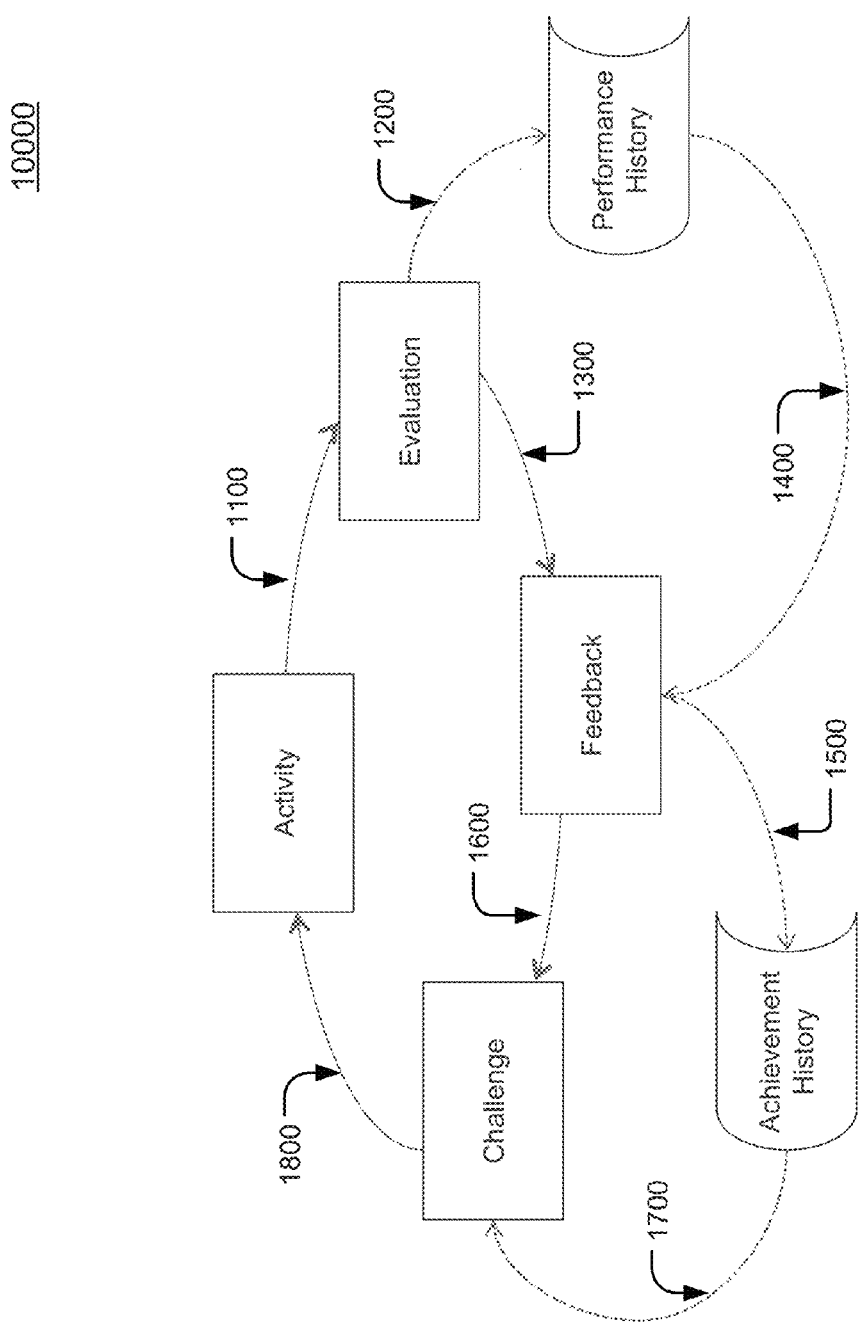
FIG. 20 shows an example of a gameplay system that is constructed according to the principles of the disclosure.

FIG. 20 illustrates an example of a gameplay system 10000 that is constructed according to the principles of the disclosure. The gameplay system may be made optional for a call-participant, and it may be configured to measure all call activity and provide a feedback to the call-participant in both real-time and post-call narrative. The system may be initiated by a call activity between a customer and a call-participant. The call activity may then be evaluated (step 1100) and although every encounter is evaluated, not every encounter may yield a post call narrative. These evaluations may then be aggregated in performance history (step 1200), which may be accrued to build up to a periodic evaluation score. During the call activity, feedback that is based purely on the customer's behavior may be provided to the call-participant (step 1300).

At the end of the call activity, post-call feedback may be provided to the call-participant and it may derive context from the call-participant's performance history (step 1400). FIG. 11 shows an example of call-participant's profile that shows e.g., player statistics, points, accomplishments, and the like. There may be certain elements within the feedback that constitute achievements (e.g., a successful sale, customer satisfaction, improved sensory measurements from the customer in certain areas, best performance to date, and so on) that are aggregated into the front-line employee's achievement history (step 1500). The achievements may also be incorporated into a leaderboard that can be facilitated to call-participant's comparing their in-game achievements with other call-participants.

Depending on certain factors, a challenge may be issued to the call-participant in the form of recommended behavior adjustments in real-time (steps 1600). This challenge may also be issued post-call and/or real-time based on context of the call-participant's prior achievements with the intent to promote new levels of achievement on the part of the call-participant (step 1700). The challenge may be reiterated to the call-participant as the new call activity initiates (step 1800).

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed:

1. A method for evaluating a call experience during a real time call in progress, the method comprising:
receiving an ongoing call signal;
generating a conversational balance data signal that indicates call symmetry of the ongoing call signal, wherein generating the conversational balance data signal comprises:
associating a portion of the ongoing call signal with each participant in the ongoing call signal; and
generating the conversational balance data signal based on the call symmetry among the call participants;
generating a conversational engagement data signal indicating quality of participant activity in the ongoing call signal;
generating a voice stress signal; and
determining a conversational experience metric based on the conversational balance data signal, the conversational engagement data signal, and the voice stress signal.

2. The method of claim 1, wherein the call symmetry is determined based on at least one of intensity, intensity variation, pitch variation, tempo, silence, accent, and intonation.

3. The method of claim 1, wherein generating the conversational engagement data signal comprises:
analyzing participant interactivity during the ongoing call signal; and
generating the conversational engagement data signal based on the participant interactivity.

4. The method of claim 3, wherein analyzing participant interactivity comprises analyzing at least one of intensity, silence, speaker dominance, turn-taking, talk over, and interruption.

5. The method of claim 1, further comprising:
determining an emotional state of a speaker based on the voice stress signal.

6. The method of claim 1, wherein the voice stress signal is based on at least one of intensity, intonation, pitch, articulation, tempo, and pitch confidence.

7. A system for evaluating a call experience during a real time ongoing call signal, the system comprising:
a conversational balance determiner that determines a conversational balance data signal indicating call symmetry of the ongoing call signal;
a conversational engagement determiner that determines quality of participant activity in the ongoing call signal;
a voice stress determiner that determines tension in the voice of a call participant; and
a channel comparator that correlates and associates a portion of the ongoing call signal with each call participant, wherein the conversational balance determiner is further configured to generate the conversational balance data signal based on the call symmetry among the call participants.

8. The system of claim 7, further comprising:
a conversational experience determiner that determines a conversational experience metric based on an output of at least one of the conversational balance determiner, the conversational engagement determiner, and the voice stress determiner.

9. The system of claim 7, wherein the call symmetry is determined based on at least one of intensity, intensity variation, pitch variation, tempo, turn-taking, talk-over, silence, accent, and intonation.

10. The system of claim 7, wherein the conversational engagement determiner is further configured to analyze participant interactivity during the ongoing call signal and generate a conversational engagement data signal based on the participant interactivity.

11. The system of claim 10, wherein participant interactivity comprises at least one of intensity, silence, speaker dominance, turn-taking, talk over, and interruption.

12. The system of claim 7, wherein the voice stress signal is based on at least one of intensity, intonation, pitch, articulation, tempo, and pitch confidence.

13. A method for evaluating a call experience real time during a call in progress, the method comprising:
receiving an ongoing call signal;
generating a conversational balance data signal that indicates call symmetry of the ongoing call signal;
generating a conversational engagement data signal indicating quality of participant activity in the ongoing call signal;
determining a conversational experience metric based on the conversational balance data signal and the conversational engagement data signal;
associating a portion of the ongoing call signal with each participant in the ongoing call signal; and
generating the conversational balance data signal based on the call symmetry among the call participants.

14. The method of claim 13, wherein the call symmetry is determined based on at least one of intensity, intensity variation, pitch variation, tempo, silence, accent, and intonation.

15. The method of claim 13, further comprising:
analyzing participant interactivity during the ongoing call signal; and
generating the conversational engagement data signal based on the participant interactivity.

16. The method of claim 15, wherein analyzing participant interactivity comprises analyzing at least one of intensity, silence, speaker dominance, turn-taking, talk over, and interruption.

17. The method of claim 13, further comprising:
generating a voice stress signal; and
determining an emotional state of the a speaker based on the voice stress signal.

* * * * *